US009288288B2

(12) United States Patent
Melman et al.

(10) Patent No.: US 9,288,288 B2
(45) Date of Patent: Mar. 15, 2016

(54) FCOE OVER TRILL

(75) Inventors: David Melman, D.N. Bikat Beit Hakerem (IL); Tal Mizrahi, Haifa (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 186 days.

(21) Appl. No.: 13/524,174

(22) Filed: Jun. 15, 2012

(65) Prior Publication Data

US 2012/0327937 A1 Dec. 27, 2012

Related U.S. Application Data

(60) Provisional application No. 61/501,616, filed on Jun. 27, 2011.

(51) Int. Cl.
| H04L 12/28 | (2006.01) |
| H04L 29/06 | (2006.01) |
| H04L 12/931 | (2013.01) |
| H04L 12/46 | (2006.01) |
| H04L 12/56 | (2006.01) |

(52) U.S. Cl.
CPC ............ *H04L 69/18* (2013.01); *H04L 12/4633* (2013.01); *H04L 49/357* (2013.01); *H04L 49/60* (2013.01)

(58) Field of Classification Search
None
See application file for complete search history.

(56) References Cited

U.S. PATENT DOCUMENTS

| 5,850,388 A | 12/1998 | Anderson et al. |
| 6,687,732 B1 | 2/2004 | Bector et al. |
| 6,886,103 B1 | 4/2005 | Brustoloni et al. |
| 7,353,362 B2 | 4/2008 | Georgiou et al. |
| 7,412,588 B2 | 8/2008 | Georgiou et al. |
| 7,706,316 B1 | 4/2010 | Kuik |
| 7,869,432 B1 | 1/2011 | Mollyn |
| 8,199,750 B1 | 6/2012 | Schultz et al. |
| 8,514,723 B2 | 8/2013 | Malomsoky et al. |
| 8,611,352 B2 | 12/2013 | Mizrahi et al. |
| 2001/0009547 A1 | 7/2001 | Jinzaki et al. |
| 2002/0073215 A1 | 6/2002 | Huitema et al. |
| 2003/0084219 A1 | 5/2003 | Yao et al. |
| 2003/0093540 A1 | 5/2003 | Lioy |
| 2003/0144993 A1 | 7/2003 | Kishigami |

(Continued)

FOREIGN PATENT DOCUMENTS

| CN | 1910571 A | 2/2007 |
| WO | WO-2005/013143 A2 | 2/2005 |

OTHER PUBLICATIONS

IEEE Std. 802.1Q™—2005, "IEEE Standard for Local and metropolitan area networks—Virtual Bridged Local Area Networks," *IEEE Computer Society*, 303 pages (May 19, 2006).

(Continued)

*Primary Examiner* — Eunsook Choi

(57) ABSTRACT

A method for forwarding FCoE packets in a network switching device includes receiving a first packet at the network switching device via an Ethernet link, determining, in the network switching device, an FC destination identifier included in the first packet, updating, in the network switching device, an Ethernet address based on the FC destination identifier, generating, in the network switching device, a first TRILL destination identifier based on the updated Ethernet address, and causing, in the network switching device, the first packet to be forwarded to a different device based on the first TRILL destination identifier.

11 Claims, 11 Drawing Sheets

(56) References Cited

U.S. PATENT DOCUMENTS

| | | |
|---|---|---|
| 2005/0120141 A1 | 6/2005 | Zur et al. |
| 2006/0251074 A1 | 11/2006 | Solomon |
| 2007/0098006 A1 | 5/2007 | Parry et al. |
| 2008/0013547 A1 | 1/2008 | Klessig et al. |
| 2008/0025308 A1 | 1/2008 | Morgan et al. |
| 2008/0159277 A1 | 7/2008 | Vobbilisetty et al. |
| 2008/0301134 A1 | 12/2008 | Miller et al. |
| 2009/0059955 A1 | 3/2009 | Georgiou et al. |
| 2009/0086725 A1 | 4/2009 | Lai et al. |
| 2009/0193114 A1 | 7/2009 | Dick et al. |
| 2011/0080916 A1 | 4/2011 | Davies et al. |
| 2011/0128974 A1 | 6/2011 | Breslin et al. |
| 2011/0205959 A1 | 8/2011 | Aalto et al. |
| 2011/0299409 A1* | 12/2011 | Vobbilisetty et al. .......... 370/252 |
| 2012/0044944 A1* | 2/2012 | Kotha et al. .................... 370/401 |
| 2012/0063316 A1 | 3/2012 | Ghanwani et al. |
| 2012/0177043 A1* | 7/2012 | Berman ........................ 370/392 |
| 2012/0182866 A1 | 7/2012 | Vinayagam et al. |
| 2012/0300772 A1 | 11/2012 | Manzella et al. |
| 2012/0327936 A1 | 12/2012 | Melman et al. |
| 2013/0258963 A1 | 10/2013 | Mihaly et al. |

OTHER PUBLICATIONS

Perlman, et al., "RBridges: Base Protocol Specification," *The Internet Engineering Task Force (IETF)—TRILL Working Group*, Internet Draft, 117 pages (Mar. 3, 2010).

Touch, et al., "Transparent Interconnection of Lots of Links (TRILL): Problem and Applicability Statement," *The Internet Engineering Task Force (IETF)—Network Working Group*, 16 pages (May 2009).

Office Action in U.S. Appl. No. 13/524,161, dated Jun. 20, 2014 (8 pages).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, pp. 1-2695 (Dec. 9, 2005).

Eastlake et al., "Trill: Fine-Grained Labeling," Internet-Draft, 21 pages (Dec. 8, 2011).

U.S. Appl. No. 61/430,413, filed Jan. 6, 2011.

U.S. Appl. No. 61/466,718, filed Jan. 23, 2011.

U.S. Appl. No. 12/938,116, filed Nov. 2, 2010.

Office Action in U.S. Appl. No. 13/524,161, dated Dec. 18, 2014, 9 pages.

Office Action in U.S. Appl. No. 13/524,161, dated Jul. 29, 2015, 10 pages.

* cited by examiner

FCOE OVER TRILL

CROSS-REFERENCE TO RELATED APPLICATION

This disclosure claims the benefit of U.S. Provisional Patent Application No. 61/501,616, entitled "FCoE Over TRILL," which was filed on Jun. 27, 2011, the disclosure of which is hereby incorporated by reference herein in its entirety.

The present application is related to U.S. patent application Ser. No. 13/524,161, entitled "FCoE Over TRILL," filed on the same day as the present application, and hereby incorporated by reference herein in its entirety.

FIELD OF TECHNOLOGY

The present disclosure relates generally to communication networks and, more particularly, to communication networks implementing multiple communication protocols.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Ethernet is increasingly used as a common infrastructure for all types of traffic within data center networks. Accordingly, other communication protocols that are useful in data center networks are increasingly required to coexist with an Ethernet infrastructure. For example, the Fibre Channel over Ethernet (FCoE) protocol is used in some Ethernet-based data center networks to allow Fibre Channel (FC) devices (e.g., in storage area networks) to relay traffic over Ethernet. As another example, the Transparent Interconnection of Lots of Links (TRILL) protocol is used in some Ethernet-based data center networks to provide shortest-path bridging between source and destination nodes on the Ethernet. As an increasing number of protocols are merged into a common architecture, however, significant inefficiencies can arise.

SUMMARY

In another embodiment, a method for forwarding Fibre Channel over Ethernet (FCoE) packets in a network switching device includes receiving a first packet at the network switching device via an Ethernet link, determining, in the network switching device, a Fibre Channel (FC) destination identifier included in the first packet, updating, in the network switching device, an Ethernet address based on the FC destination identifier, generating, in the network switching device, a first Transparent Interconnection of Lots of Links (TRILL) destination identifier based on the updated Ethernet address, and causing, in the network switching device, the first packet to be forwarded to a different device based on the first TRILL destination identifier.

In another embodiment, a network switching device includes an Ethernet interface configured to receive a packet via an Ethernet link, and an FCoE entity configured to determine an FC destination identifier included in the packet and update an Ethernet address based on the FC destination identifier. The network switching device also includes a TRILL entity configured to generate a TRILL destination identifier based on the updated Ethernet address and cause the packet to be forwarded to a different device based on the TRILL destination identifier.

In another embodiment, a first network switching device includes a first Ethernet interface configured to receive an FCoE packet, a first FCoE entity configured to update a first forwarding address included in the FCoE packet to indicate a first FCoE hop target, and a first TRILL entity configured to encapsulate the FCoE packet with a first set of one or more headers according to a TRILL protocol.

In another embodiment, a method for forwarding FCoE packets includes receiving, at a first network switching device, an FCoE packet, updating, in the first network switching device, a first forwarding address included in the FCoE packet to indicate a first FCoE hop target, and encapsulating, in the first network switching device, the FCoE packet with a first set of one or more headers according to a TRILL protocol.

DETAILED DESCRIPTION

Figure 1:
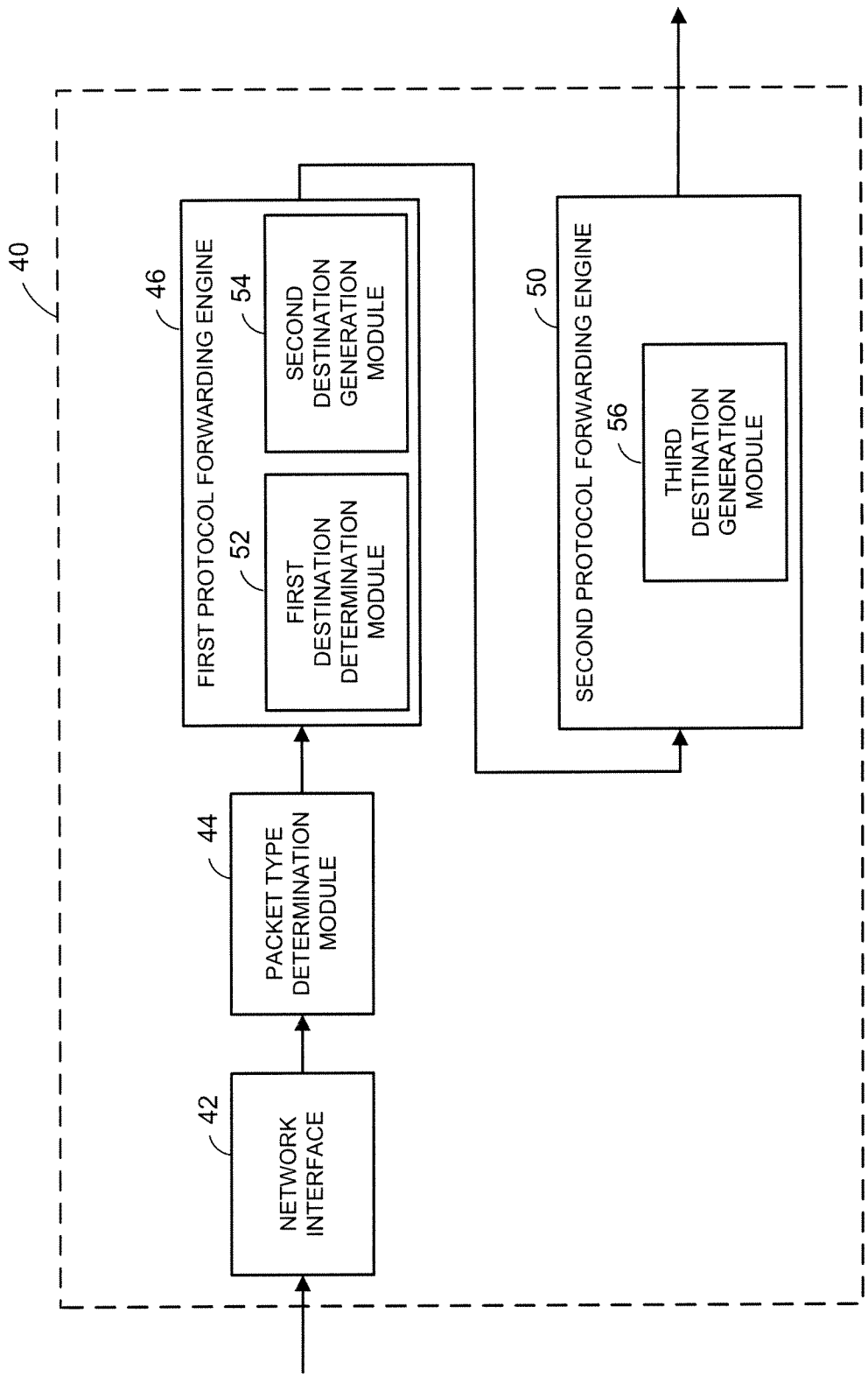
FIG. 1 is a block diagram of an example network device that implements packet processing techniques of the present disclosure, according to an embodiment.

Various communication protocols, such as Ethernet, Fibre Channel over Ethernet (FCoE), and Transparent Interconnection of Lots of Links (TRILL), are commonly used in data center environments. FCoE allows Ethernet to carry traffic between native Fibre Channel (FC) devices, such as devices used in storage area networks, and/or FCoE end nodes (ENodes). An FCoE packet is formed by encapsulating an FC frame with an Ethernet header. The FC frame includes an FC destination identifier "D_ID" that indicates the intended recipient of the FC frame. Typically, an FCoE forwarder (FCF) device or FCoE data-plane forwarder (FDF) device updates source and destination media access control (MAC) addresses of the Ethernet header of the FCoE packet at each hop until the device corresponding to the FC destination identifier (or a native FC network including such a device) is reached. In particular, the source MAC address is changed to the MAC address of the FCF or FDF device forwarding the packet, and the destination MAC address is changed to the MAC address of either the destination indicated by the FC destination identifier, or the next FCF or FDF device on the hop path towards that destination. At each hop, the FCF or FDF device determines the destination MAC address for the next hop based on the FC destination identifier and a routing protocol called Fabric Shortest Path First (FSPF). Typically, each FCF or FDF device also enforces security policies between ENodes, in a process referred to as "zoning". Under the current FCoE Standard, INCITS T11 FC-BB-5, each FCoE packet must be forwarded through at least one FCF device or FDF device.

TRILL efficiently handles Ethernet traffic by providing shortest-path bridging over a TRILL cloud that includes TRILL routing bridge devices known as "RBridges". The TRILL cloud is generally transparent to the rest of the network. When an Ethernet packet encounters the TRILL cloud, a first RBridge device serves as an "ingress RBridge". Whereas FCoE encapsulates an FC frame in an Ethernet packet by adding Ethernet header information, the ingress RBridge device encapsulates each Ethernet packet by adding TRILL protocol header information. Specifically, the ingress RBridge device adds a "TRILL header" and a link transport header.

The TRILL header includes a TRILL destination identifier known as an Egress RBridge Nickname. For a particular Ethernet packet received by the ingress RBridge device, the Egress RBridge Nickname indicates which RBridge device will serve as an "egress RBridge" device terminating the TRILL cloud. Generally, the ingress RBridge device will select as the egress RBridge device an RBridge device that is nearest to the intended destination of the Ethernet packet (as identified by the destination MAC address of the original Ethernet packet).

The link transport header includes an additional source MAC address and an additional destination MAC address which, unlike the source and destination MAC addresses of the original, encapsulated Ethernet packet, are exposed to the Ethernet layer of each RBridge device that forwards the packet through the TRILL cloud. In the ingress RBridge device, the source MAC address of the link transport header is set to the MAC address of the ingress RBridge device, and the destination MAC address of the link transport header is set to the MAC address of a next-hop RBridge device. The next-hop RBridge device is determined based on the Egress RBridge Nickname such that the overall path length between the ingress RBridge device and the egress RBridge device is minimized. Thereafter, while traveling through any number of "transit RBridge" devices between the ingress and egress RBridge devices in the TRILL cloud, the source and destination MAC address are updated at each hop to reflect the current RBridge device and the next-hop RBridge device, respectively (again, in a manner that minimizes the overall path length). When the packet reaches the egress RBridge device (either after being forwarded through one or more transit RBridge devices, or immediately after being forwarded by the ingress RBridge device), the egress RBridge device decapsulates the packet by removing the link transport header and the TRILL header, thereby exposing the destination MAC address of the original Ethernet packet to the Ethernet layer once more.

In embodiments described below, network devices (e.g., switching devices) are configured to handle multiple communication protocols (e.g., FCoE and TRILL, in an embodiment) that coexist in a data network. In some of these embodiments, various processing engines within a single network device (e.g., a network switch) are configured to make forwarding decisions according to the different protocols. By handling the forwarding decisions of the different protocols as described in embodiments below, data packets can in some scenarios be directed through the data network in a more efficient manner. For example, in some embodiments and scenarios, data packets are forwarded through a path that includes a lower number of switching devices (and/or other network devices) as compared to conventional architectures.

FIG. 1 is a block diagram of an example network device 40 that implements packet processing techniques of the present disclosure, according to an embodiment. The network device 40 includes a network interface 42, a packet type determination module 44, a first protocol forwarding engine 46 that forwards packets based on destination information of a first protocol, and a second protocol forwarding engine 50 that forwards packets based on destination information of a different, second protocol.

The network interface 42 generally interfaces the device 40 with one or more physical ingress ports. In an embodiment, the network interface 42 is configured to receive packets conforming to a third protocol different than the first and second protocols. For example, in one embodiment where the first and second protocols are FCoE and TRILL, respectively, the third protocol is an Ethernet protocol (e.g., the network interface 42 is an Ethernet interface configured to receive Ethernet packets from a network). In some of these embodiments, the network interface 42 is configured to receive various different types of packets that include an Ethernet header (e.g., a header including an Ethernet MAC address). For example, in one embodiment, the network interface 42 is configured to receive both FCoE packets and TRILL-encapsulated Ethernet packets, because both include Ethernet-style headers that include MAC addresses.

The packet type determination module 44 is coupled to the network interface 42. The packet type determination module 44 is configured to determine whether packets received by network interface 42 conform to the first protocol. In some embodiments, this determination is made by determining a virtual local area network identifier (VLAN ID) included in the received packet, by determining a destination MAC address included in the received packet, and/or by analysis of any other information included in a header of the packet, for example. For example, in an embodiment, packets conforming to the first protocol are tagged, prior to being received at the network device 40, with a particular VLAN ID (or one of a particular set of VLAN IDs) corresponding to the first protocol. As another example, in an embodiment, packets conforming to the first protocol have a destination MAC address identifying an entity in the network device that operates according to the first protocol. For example, in one embodiment where the first protocol is an FCoE protocol, packets that include the destination MAC address of an FCoE entity (e.g., an FCF entity) within network device 40 are determined to conform to the first protocol.

In some embodiments, the various modules and/or engines of the device 40 are arranged as a pipeline of hardware processing units. In some of these embodiments, a received packet is directed through the first protocol forwarding engine 46 even if the packet type determination module 44 determines that the packet does not conform to the first protocol, in order to avoid interrupting flow through the pipeline. For example, in an embodiment, received packets not conforming to the first protocol are passed through the first protocol forwarding engine 46, but without applying some or all of the processing operations of the first protocol forwarding engine 46. In other of these embodiments, received packets are directed to the first protocol forwarding engine 46 only if the packets conform to the first protocol. For example, in one embodiment, packets not conforming to the first protocol are directed to a separate path (not shown) that bypasses at least the first protocol forwarding engine 46. In an alternative embodiment, the network device 40 does not include a packet type determination module 44. For example, in an embodiment, all received packets are operated on by the first protocol forwarding engine 46 (e.g., the device 40 assumes that all received packets conform to a particular protocol, in an embodiment).

The first protocol forwarding engine 46 is coupled to the packet type determination module 44, in an embodiment. In the example embodiment of FIG. 1, the first protocol forwarding engine 46 includes a first destination determination module 52 and a second destination generation module 54. In other embodiments, however, the first destination determination module 52 and second destination generation module 54 are included in separate processing engines of the network device 40.

The first destination determination module 52 is configured to determine first destination information in the received packet, where the first destination information conforms to the first protocol and identifies a first destination. For example, in one embodiment where the first protocol is an FCoE protocol, the first destination determination module 52 is configured to determine an FC destination identifier (e.g., D_ID) in the received packet (e.g., in an FC frame portion of a received FCoE packet) that identifies a destination FC device or entity (e.g., an ENode). The second destination generation module 54 is configured to generate, based on the first destination information determined by the first destination determination module 52, second destination information that conforms to the third protocol and identifies a second destination. In some embodiments, the third protocol is an Ethernet protocol such as, for example, a 10BASE-T, 40 GbE, or 100 GbE protocol, and the generated second destination information is an Ethernet destination MAC address. The second destination information additionally conforms, in some embodiments, to the first protocol. For example, although a destination MAC address (generated by the second destination generation module 54, in an embodiment) conforms to an Ethernet protocol, the address is also used within an FCoE protocol to identify a destination FCoE entity, in an embodiment.

The second destination information generated by the second destination generation module 54 is added to the received packet. For example, in various embodiments, the second destination information is added as an additional header or header field of the packet, or is added to a packet descriptor corresponding to the packet. In some embodiments, the second destination information is added by updating an existing destination address field (such as an existing destination MAC address in a header, for example) of the received packet.

The second protocol forwarding engine 50 is coupled to the first protocol forwarding engine 46. The second protocol forwarding engine 50 is not configured to process destination information that conforms to the first protocol (e.g., the first destination information determined by module 52), but is configured to process destination information that conforms to the second protocol. For example, in one embodiment, the second protocol forwarding engine 50 is not configured to process destination information conforming to an FCoE protocol (e.g., a D_ID), but is configured to process destination information conforming to a TRILL protocol (e.g., an Egress RBridge Nickname). The second protocol forwarding engine 50 includes a third destination generation module 56 configured to generate, based on the second destination information generated by the second destination generation module 54, third destination information that conforms to the second protocol and identifies a third destination. In some embodiments, the third destination is a module or processing engine within the network device 40. In other embodiments, the third destination is a device other than network device 40, or an entity within a device other than network device 40. For example, in one embodiment where the second protocol is a TRILL protocol, the generated third destination information includes an Egress RBridge Nickname, and the third destination is a corresponding egress RBridge entity in a different network device. In one such embodiment, the second protocol forwarding engine 50 is an ingress RBridge entity.

The third destination information generated by the third destination generation module 56 is added to the received packet. For example, in various embodiments, the third destination information is added as an additional header or header field of the packet, or is added to a packet descriptor corresponding to the packet. In some embodiments, the third destination information is added by updating an existing destination address field (such as an existing egress RBridge nickname in a TRILL header, for example) of the received packet.

In some embodiments, the network device 40 includes additional modules and/or processing engines not shown in FIG. 1. For example, in one embodiment where the first and second protocols are FCoE and TRILL, respectively, the second protocol forwarding engine 50 includes an additional module that determines a next-hop destination MAC address (associated with a subsequent RBridge device or entity) based on an Egress RBridge Nickname included in a TRILL header of a packet being processed. As another example, in an embodiment, an additional processing engine coupled to the output of the second protocol forwarding engine 50 acts as a policy engine (e.g., in one embodiment where the second protocol is a TRILL protocol, as a policy engine for TRILL traffic). As yet another example, in an embodiment, the network device 40 also includes a second network interface that interfaces the device 40 with one or more physical egress ports.

Each of the units illustrated in the example network device 40 is implemented in hardware, in a processor that executes firmware and/or software instructions, or a combination thereof. In some embodiments, all of the units illustrated in the example network device 40 are implemented in whole or in part in hardware, and all units process the packet substantially at wire speed. For example, all of the units are implemented in a hardware pipeline architecture within an application specific integrated circuit (ASIC), in an embodiment. In other embodiments, a different type of integrated circuit is used such as a programmable logic device (PLD), a field programmable gate array (FPGA), a programmable logic array (PLA), a custom integrated circuit, etc. In some embodiments, the units of the example network device 40 are implemented on multiple different integrated circuits that are coupled together.

Figure 2:
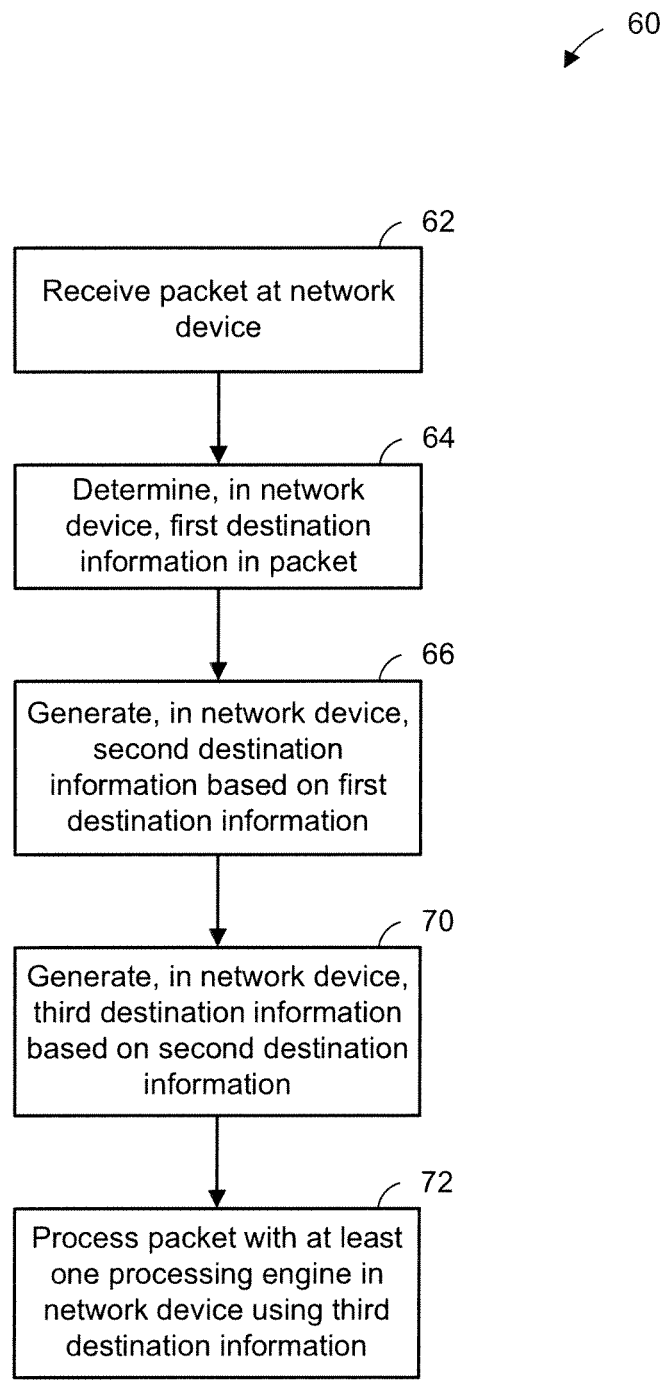
FIG. 2 is a flow diagram of an example method for processing packets in a network device, according to an embodiment.

FIG. 2 is a flow diagram of an example method 60 for processing packets in a network device, according to an embodiment. The method 60 is implemented by a network device that includes at least one processing engine that is not configured to process destination information that conforms to a first protocol, but is configured to process destination information that conforms to a second protocol. For example, in an embodiment, the processing engine(s) is/are not configured to process destination information conforming to an FCoE protocol (e.g., not configured to process the D_ID field of an FCoE packet), but are configured to process destination information conforming to a TRILL protocol (e.g., configured to process the Egress RBridge Nickname field in a TRILL header of a TRILL-encapsulated Ethernet or FCoE packet). In an embodiment, the method 60 is implemented by the network device 40 of FIG. 1.

At block 62, a packet is received at the network device performing the method 60. In an embodiment, the packet is received by a network interface similar to the network interface 42 of FIG. 1.

At block 64, first destination information included in the packet received at block 62 is determined by the network device performing the method 60. In an embodiment, the first destination information is determined by a processing engine such as the first protocol forwarding engine 46 of FIG. 1. The first destination information conforms to the first protocol. For example, in an embodiment where the first protocol is an FCoE protocol, the first destination information includes an FC destination identifier, such as the FC destination identifier D_ID. The first destination information corresponds to a first destination, such as an ENode that is the intended recipient of the packet received at block 62, in an embodiment.

At block 66, second destination information is generated, in the network device performing the method 60, based on the first destination information determined at block 64. In an embodiment, the second destination information is generated by a processing engine such as the first protocol forwarding engine 46 of FIG. 1. The second destination information conforms to a third protocol. In some embodiments, the third protocol is a protocol that resides at least in part at a lower protocol stack layer (or group of layers) than the first and second protocols. For example, in one embodiment where the first and second protocols are FCoE and TRILL protocols, respectively, the third protocol is an Ethernet protocol and the second destination information includes a destination MAC address. In an embodiment, the second destination information corresponds to a destination that is between the network device performing the method 60 and the destination corresponding to the first destination information determined at block 64. For example, in one embodiment where the first protocol is an FCoE protocol and the third protocol is an Ethernet protocol, the second destination information includes a destination MAC address corresponding to an FCF or FDF entity or device that will be used to forward the packet. In some embodiments, the second destination information is generated at block 66 at least in part by determining a path length (such as a number of hops, for example, or another suitable metric) between a destination corresponding to the first destination information and another destination corresponding to the second destination information. For example, in one embodiment, the network device performing the method 60 includes and/or accesses a memory (e.g., a content addressable memory) that stores a table, where each entry corresponding to first destination information (e.g. a particular FC destination identifier) is indexed to an entry corresponding to second destination information (e.g., a particular MAC address of an FCF or FDF device or entity on a shortest-path route to the FC destination).

At block 70, third destination information is generated, in the network device performing the method 60, based on the second destination information generated at block 66. In an embodiment, the third destination information is generated by a processing engine such as the second protocol forwarding engine 50 of FIG. 1. The third destination information conforms to the second protocol. In an embodiment, the third destination information corresponds to a destination that is between the network device performing the method 60 and a destination corresponding to the second destination information generated at block 66. For example, in one embodiment where the first, second, and third protocols are FCoE, TRILL, and Ethernet, respectively, the third destination information includes an Egress RBridge Nickname corresponding to an egress RBridge entity or device located between the network device performing the method 60 and an FCF device or entity that corresponds to the second destination information. In some embodiments, the third destination information is generated at block 70 at least in part by determining a path length between a destination corresponding to the third destination information and a destination corresponding to the second destination information. For example, in one embodiment, the network device performing the method 60 includes and/or accesses a memory (e.g., a content addressable memory) that stores a table, where each entry corresponding to second destination information (e.g., a particular MAC address) is indexed to an entry corresponding to third destination information (e.g., a particular Egress RBridge Nickname of an RBridge device or entity on a shortest-path route to the device or entity corresponding to the MAC address).

At block 72, at least one processing engine included in the network device performing the method 60 processes the packet using the third destination information generated at block 70. In an embodiment, the packet is processed by the same processing engine that generated the third destination information at block 70 (e.g., the second protocol forwarding engine 50 of FIG. 1). In one embodiment, the packet is processed at block 72 at least in part by causing the packet to be forwarded to a different device based on the third destination information. In one such embodiment, causing the packet to be forwarded includes generating fourth destination information conforming to the third protocol based on the third destination information, and/or adding one or more headers to the packet that include the fourth destination information. In one embodiment where the third protocol is an Ethernet protocol, the fourth destination information includes a destination MAC address corresponding to a destination between the network device performing the method 60 and the third destination corresponding to the third destination information generated at block 70. In one embodiment, the fourth destination information is generated at least in part by determining a path length between a destination corresponding to the fourth destination information (e.g., a transit RBridge device or entity) and a destination corresponding to the third destination information (e.g., an egress RBridge device or entity). For example, in one embodiment, the network device performing the method 60 includes and/or accesses a memory (e.g., a content addressable memory) that stores a table, where each entry corresponding to third destination information (e.g. a particular Egress RBridge Nickname) is indexed to an entry corresponding to fourth destination information (e e.g., to a MAC address of a particular RBridge device or entity on a shortest-path route to the egress RBridge device or entity).

In some embodiments, the method 60 includes additional blocks not seen in FIG. 2. For example, in one embodiment, the method 60 also includes determining that the packet received at block 62 conforms to the first protocol. In an embodiment, this determination occurs prior to determining the first destination information at block 64. In some embodiments, determining that the packet conforms to the first protocol includes determining a VLAN ID included in the packet, determining a MAC address included in the packet, and/or analyzing any other information included in a header of the packet, for example. For example, in one embodiment where the first protocol is an FCoE protocol, it is determined that the packet is an FCoE protocol if a VLAN ID in the packet indicates that the packet is associated with a VLAN ID reserved for FCoE traffic, and/or if a destination MAC address in the packet is the MAC address of an FCoE device or entity such as an FCF or FDF device or entity.

FIGS. 3-11 are directed to embodiments in which FCoE and TRILL protocols are used together in a network having an Ethernet infrastructure. The disclosed systems and methods utilize special network switching devices referred to herein as FCoE-forwarder-over-RBridge (FCRB) devices, which in some embodiments and scenarios improve network efficiency by incorporating both FCoE protocol and TRILL protocol functionality in a single device.

Figure 3:
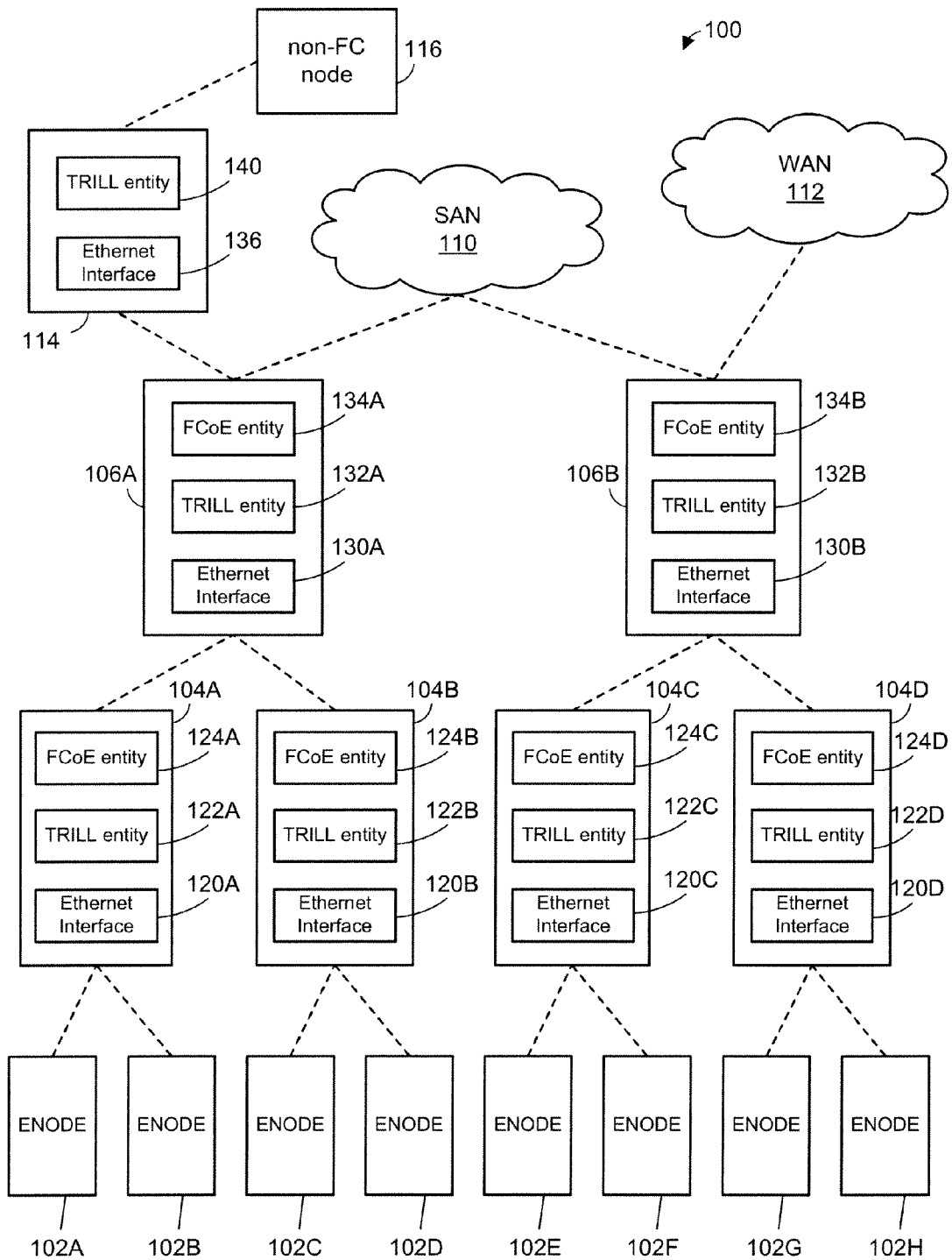
FIG. 3 is a block diagram of an example data center network that utilizes network devices, such as the example network device of FIG. 1, to implement FCoE and TRILL protocols within an Ethernet infrastructure, according to an embodiment.

FIG. 3 is a block diagram of an example data center network 100 that utilizes network devices, such as the example network device 40 of FIG. 1, to implement FCoE and TRILL protocols within an Ethernet infrastructure, according to an embodiment. The example data center network 100 includes a pluralityy of ENodes 102A-102H, a first set of FCRB devices 104A-104D, a second set of FCRB devices 106A-106B, a storage area network (SAN) 110, a wide area network (WAN) 112, an RBridge device 114, and a non-FCoE node 116. In the embodiment shown in FIG. 3, the FCRB devices 104A-104D are top-of-rack (TOR) switching devices and the FCRB devices 106A-106B are end-of-row (EOR) switching devices. While FIG. 3 shows eight ENodes 102A-102H, four TOR FCRB devices 104A-104D, and two EOR FCRB devices 106A-106B, other embodiments include more or fewer than eight ENodes 102, more or fewer than four TOR FCRB devices 104, and more or fewer than two EOR FCRB devices 106.

Each of the ENodes 102A-102H is a network node (e.g., a logical node in a server, in an embodiment) configured to transmit and/or receive data packets according to an FCoE protocol. In some embodiments, one or more of the ENodes 102A-102H is a logical entity in a device that includes one or more additional logical entities for transmitting and/or receiving data packets according to one or more non-FCoE protocols (e.g., an IP-over-Ethernet protocol, etc.). For example, in an embodiment, each of ENodes 102A-102H is a logical entity in a device that also includes an Ethernet network interface card (NIC) for transmitting and/or receiving non-FCoE packets. In an embodiment, both FCoE packets generated by an ENode of a device and non-FCoE packets generated by a different entity of the device are transmitted and/or received via a physical Ethernet interface.

Each of the TOR FCRB devices 104A-104D is communicatively coupled to one or more of ENodes 102A-102H. For example, in the example data center network 100 shown in FIG. 3, TOR FCRB device 104A is communicatively coupled to ENodes 102A and 102B, the TOR FCRB device 104B is communicatively coupled to ENodes 102C and 102D, etc. In some embodiments, one or more of the TOR FCRB devices 104A-104D are indirectly coupled to corresponding nodes of ENodes 102A-102H (e.g., through additional switching devices or other packet processing devices). In other embodiments, the TOR FCRB devices 104A-104D are directly coupled to corresponding nodes of ENodes 102A-102H (e.g. via Ethernet cables, in an embodiment). While FIG. 3 shows that each of TOR FCRB devices 104A-104D is coupled to two of ENodes 102A-102H, each of TOR FCRB devices 104A-104D is coupled to more or fewer than two of ENodes 102A-102H in other embodiments. Moreover, in some embodiments, different devices of TOR FCRB devices 104A-104D are coupled to different numbers of ENodes 102A-102H (e.g. TOR FCRB device 104A is coupled to one of ENodes 102A-102H, TOR FCRB device 104B is coupled to three of ENodes 102A-102H, etc., in an embodiment).

Each of the TOR FCRB devices 104A-104D includes an Ethernet interface 120, a TRILL entity 122, and an FCoE entity 124. The Ethernet interface 120 in each of TOR FCRB devices 104A-104D is configured to receive packets via one or more Ethernet links. For example, Ethernet interface 120A of TOR FCRB device 104A is configured to receive packets via Ethernet links to Enode 102A, ENode 102B, and EOR FCRB device 106A. In some embodiments, each Ethernet interface 120 includes multiple physical ingress and egress ports. In an embodiment, each Ethernet interface 120 includes a network interface similar to the network interface 42 of FIG. 1.

The TRILL entity 122 in each of TOR FCRB devices 104A-104D operates on received packets according to a TRILL protocol. The operation(s) performed by a particular TRILL entity 122 depend(s) on the position of the corresponding TOR FCRB device 104A, 104B, 104C, or 104D with respect to the path followed by a received packet. For example, in one embodiment and scenario where the TOR FCRB device 104A receives a packet from ENode 102A (destined for ENode 102C, for example), the TOR FCRB device 104A encapsulates the received packet with one or more headers containing TRILL information. In some of these embodiments, the TOR FCRB device 104A generates TRILL destination information to be included in the added header(s). As another example, in some embodiments and scenarios where the TOR FCRB device 104A receives a packet from the EOR FCRB device 106A (destined for the ENode 102C, for example) the TOR FCRB device 104A decapsulates the packet by removing one or more headers containing TRILL information. In an embodiment, removing the header(s) containing TRILL information exposes FCoE destination address information (such as a next-hop MAC address and an FC destination identifier, for example) within the encapsulated FCoE packet, which can then be used by an FCoE entity (e.g., FCF or FDF) that subsequently receives the packet to make forwarding decisions according to the FCoE protocol.

In an embodiment, the TRILL entity 122 includes one or more RBridge entities to perform the TRILL operation(s). In some embodiments, the TRILL entity 122 includes at least an ingress RBridge entity and an egress RBridge entity. Depending on the source and/or destination of the packet received at the TOR FCRB device 104A, 104B, 104C, or 104D, different RBridge entities within the TRILL entity 122 are utilized or not utilized, in an embodiment. For example, for FCoE packets sent by ENode A and destined for ENode C, the TOR FCRB device 104A utilizes an ingress RBridge entity of TRILL entity 122A, and the TOR FCRB device 104B utilizes an egress RBridge entity of TRILL entity 122B, in an embodiment. As another example, for FCoE packets sent by ENode A and destined for ENode B, the TOR FCRB device 104A utilizes both an ingress RBridge entity and an egress RBridge entity of the TRILL entity 122A. In some embodiments, each RBridge entity within a TRILL entity 122 is associated with its own MAC address (e.g., one address for an ingress RBridge entity and one address for an egress RBridge entity, in an embodiment). Operation of the TRILL entity 122, including how different RBridge entities and/or functionalities within the TRILL entity 122 may be utilized based on the destination of a received packet, are described below with reference to various embodiments and scenarios in FIGS. 4-9. In an embodiment, each TRILL entity 122 includes a processing engine similar to the second protocol forwarding engine 50 of FIG. 1.

The FCoE entity 124 of each of TOR FCRB devices 104A-104D operates on received packets according to an FCoE protocol. In an embodiment, the FCoE entity 124 determines an FC destination identifier of each FCoE packet (e.g., a D_ID field included in an FCoE-encapsulated FC frame of the FCoE packet) and, based on the determined FC destination identifier, updates a next-hop destination MAC address of the FCoE packet. In some embodiments, each FCoE entity 124 only operates on received FCoE packets (i.e., received packets conforming to an FCoE protocol), and each of the TOR FCRB devices 104A-104D causes non-FCoE packets to bypass the FCoE entity 124.

In an embodiment, each FCoE entity 124 includes an FDF entity configured to perform the FCoE operation(s). In some embodiments, each FDF entity is associated with its own MAC address. Operation of the FCoE entity 124 is discussed in more detail below with reference to various example embodiments and scenarios in FIGS. 4-9. In an embodiment, each FCoE entity 124 includes a processing engine similar to the first protocol forwarding engine 46 of FIG. 1.

Each of the EOR FCRB devices 106A-106B is communicatively coupled to one or more of the TOR FCRB devices 104A-104D. For example, in the example data center network 100 shown in FIG. 3, the EOR FCRB device 106A is communicatively coupled to the TOR FCRB devices 104A and 104B, and the EOR FCRB device 106B is communicatively coupled to the TOR FCRB devices 104C and 104D. In some embodiments, one or both of the EOR FCRB devices 106A-106B are indirectly coupled to the corresponding one of TOR FCRB devices 104A-104D (e.g., through RBridge devices or other packet processing devices). In other embodiments, the EOR FCRB devices 106A-106B are directly coupled to the corresponding one of TOR FCRB devices 104A-104D (e.g., via Ethernet cables, in an embodiment). While FIG. 3 shows that each of the EOR FCRB devices 106A-106B is coupled to two of the TOR FCRB devices 104A-104D, each of the EOR FCRB devices 106A-106B is coupled to more or fewer than two of TOR FCRB devices 104A-104D in other embodiments. Moreover, in some embodiments, different ones of EOR FCRB devices 106A-106B are coupled to different numbers of TOR FCRB devices 104A-104D (e.g., EOR FCRB device 106A is coupled to one of TOR FCRB device 104A-104D, EOR FCRB device 106B is coupled to two of TOR FCRB devices 104A-104D, etc., in an embodiment).

Each of the EOR FCRB devices 106A-106B includes an Ethernet interface 130, a TRILL entity 132, and an FCoE entity 134. The Ethernet interface 130 of each of the EOR FCRB devices 106A-106B is configured to receive packets via one or more Ethernet links. For example, Ethernet interface 130A of EOR FCRB device 106A is configured to receive packets via Ethernet links to TOR FCRB device 104A, TOR FCRB device 104B, RBridge device 114, and SAN 110, in an embodiment.

In an embodiment, the EOR FCRB devices 106A-106B are similar to the TOR FCRB devices 104A-104D (e.g., the Ethernet interfaces 130 are similar to the Ethernet interfaces 120, the TRILL entities 132 are similar to the TRILL entities 122, and the FCoE entities 134 are similar to the FCoE entities 124, in an embodiment). In some embodiments, however, the FCoE and/or TRILL entities in the TOR FCRB devices 104A-104D and the EOR FCRB devices 106A-106B differ in certain respects. For example, in one embodiment, the FCoE entities 134 each include an FCF entity, while the FCoE entities 124 each include an FDF entity. As another example, in some embodiments, the TRILL entities 132 each include hardware configured to operate as a transit RBridge entity, while the TRILL entities 122 do not include hardware configured to operate as a transit RBridge entity. In various other embodiments, the FCoE entities 134 are the same as FCoE entities 124 (e.g., both include an FCF entity, in an embodiment), and/or the TRILL entities 122 are the same as the TRILL entities 132 (e.g., both include an ingress RBridge entity, an egress RBridge entity, and a transit RBridge entity, in an embodiment, even if the TRILL entities 122 do not ever utilize the transit RBridge entities due to their location in the data center network 100).

In the example of FIG. 3, SAN 110 is communicatively coupled to the EOR FCRB devices 106A-106B. In other embodiments, SAN 110 is coupled to only one of the EOR FCRB devices 106A-106B, or to more than two but not all EOR FCRB devices 106. SAN 110 is a native FC network, in some embodiments. In some of these embodiments, the EOR FCRB devices 106A-106B are configured to convert traffic destined for SAN 110 to native FC frames. In other embodiments, SAN 110 includes one or more devices capable of converting FCoE packets into native FC frames.

Similarly, in the example of FIG. 3, WAN 112 is communicatively coupled to the EOR FCRB device 106B. In other embodiments, WAN 112 is coupled to both of the EOR FCRB devices 106A-106B, or to more than two EOR FCRB devices 106. WAN 112 is a non-FC network, in some embodiments. In some of these embodiments, the EOR FCRB devices 106A-106B are configured to convert traffic destined for WAN 112 into appropriate packet types (e.g., non-FCoE Ethernet packets). In other embodiments, WAN 112 includes one or more devices capable of converting FCoE packets to non-FCoE packets.

In the example of FIG. 3, the RBridge device 114 is communicatively coupled to the EOR FCRB device 106A, and is configured to operate according to a TRILL protocol (e.g., to operate as an RBridge in a TRILL cloud). The non-FC node 116 is a network node (e.g., a device on the network 100, such as a server) communicatively coupled to RBridge device 114, and is configured to transmit and/or receive non-FCoE packets (e.g., IP-over-Ethernet packets). While FIG. 3 shows RBridge device 114 and non-FC node 116 as being separate from WAN 112, both are a part of WAN 112 in other embodiments.

Figure 4:
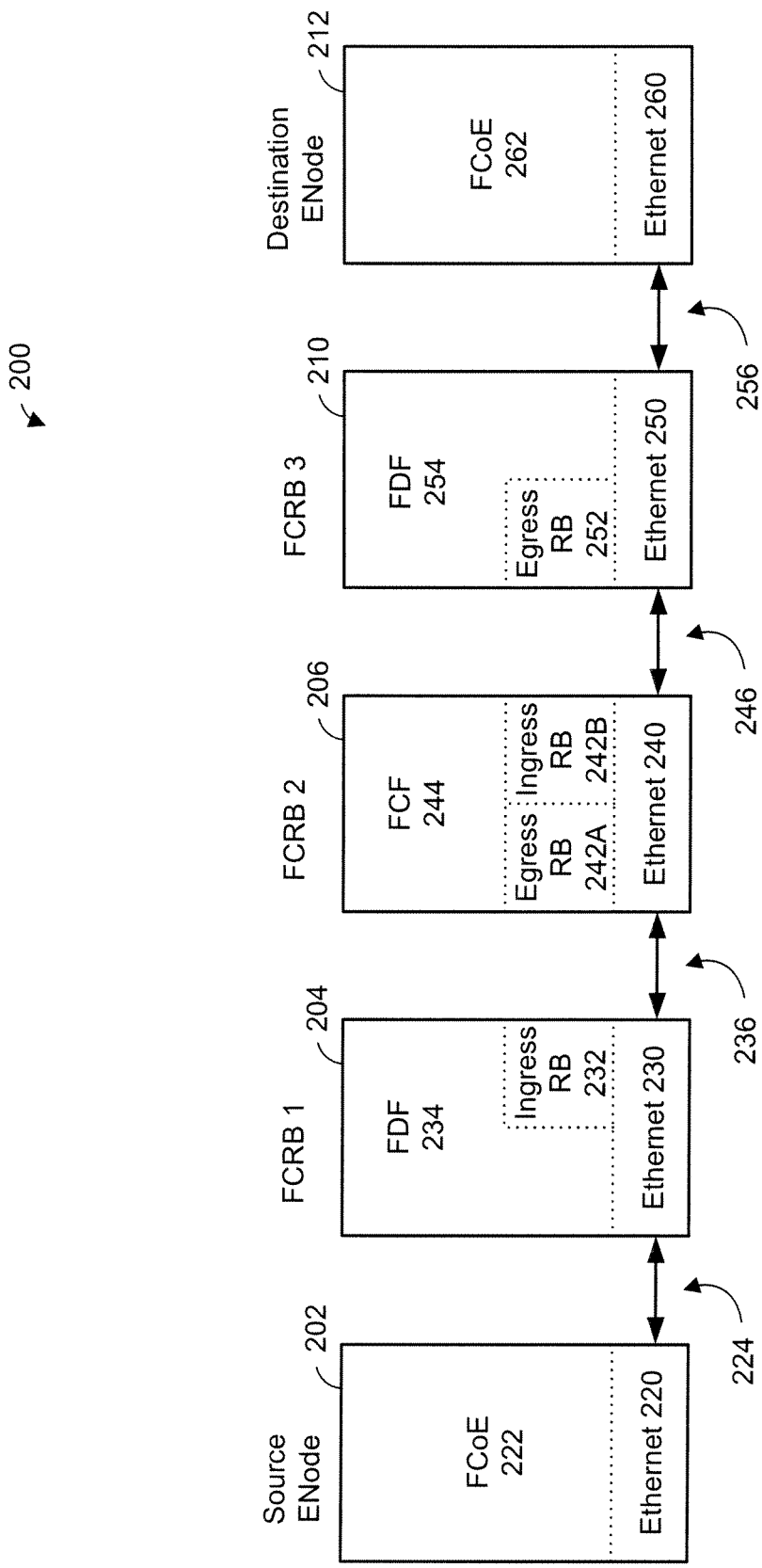
FIG. 4 is a block diagram of an example path of an FCoE packet in a data center network such as the example data center network of FIG. 3, according to an embodiment.
Figure 5:
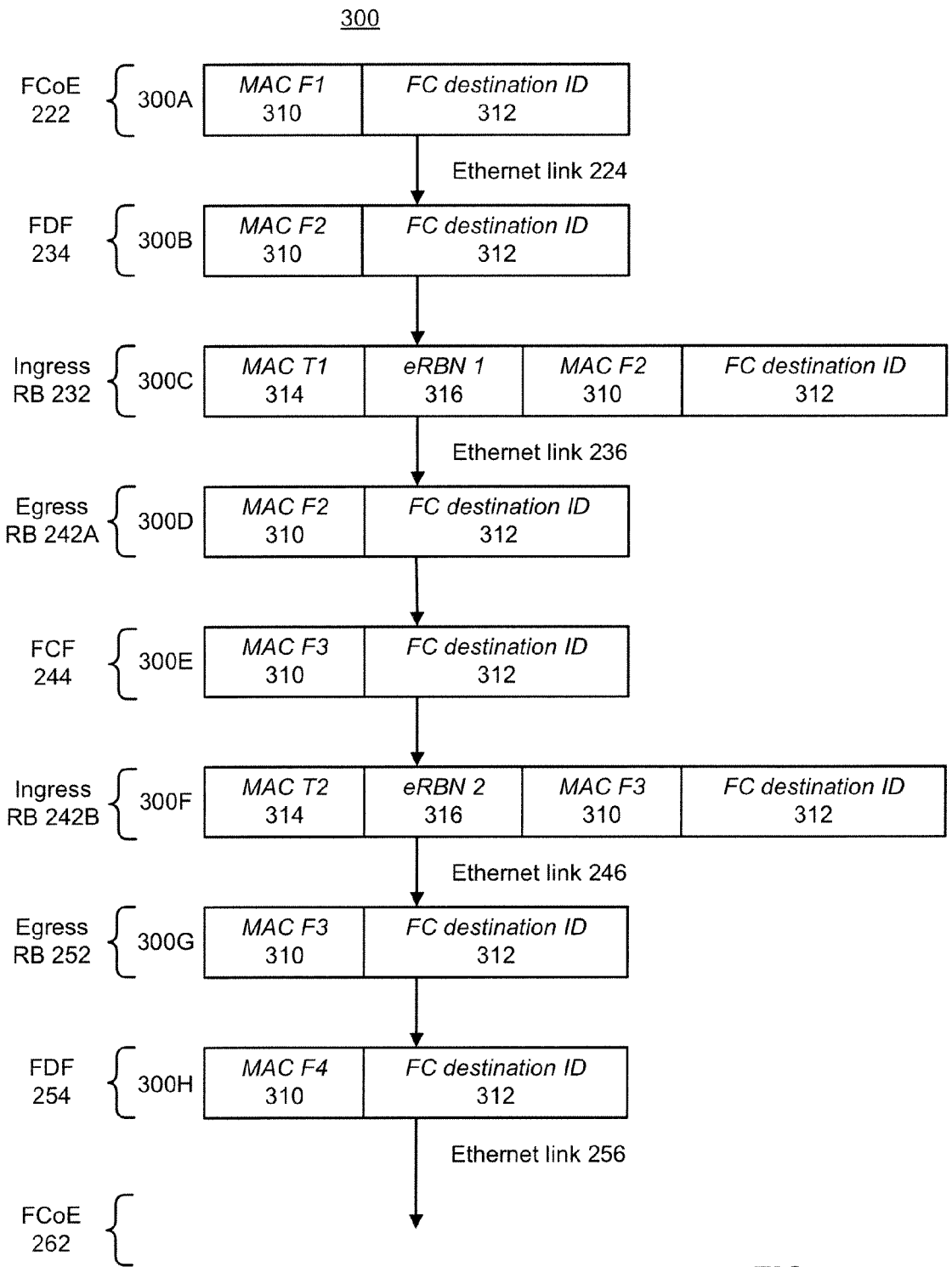
FIG. 5 is a block diagram of an example FCoE packet as it travels through the example path of FIG. 4, according to an embodiment.
Figure 6:
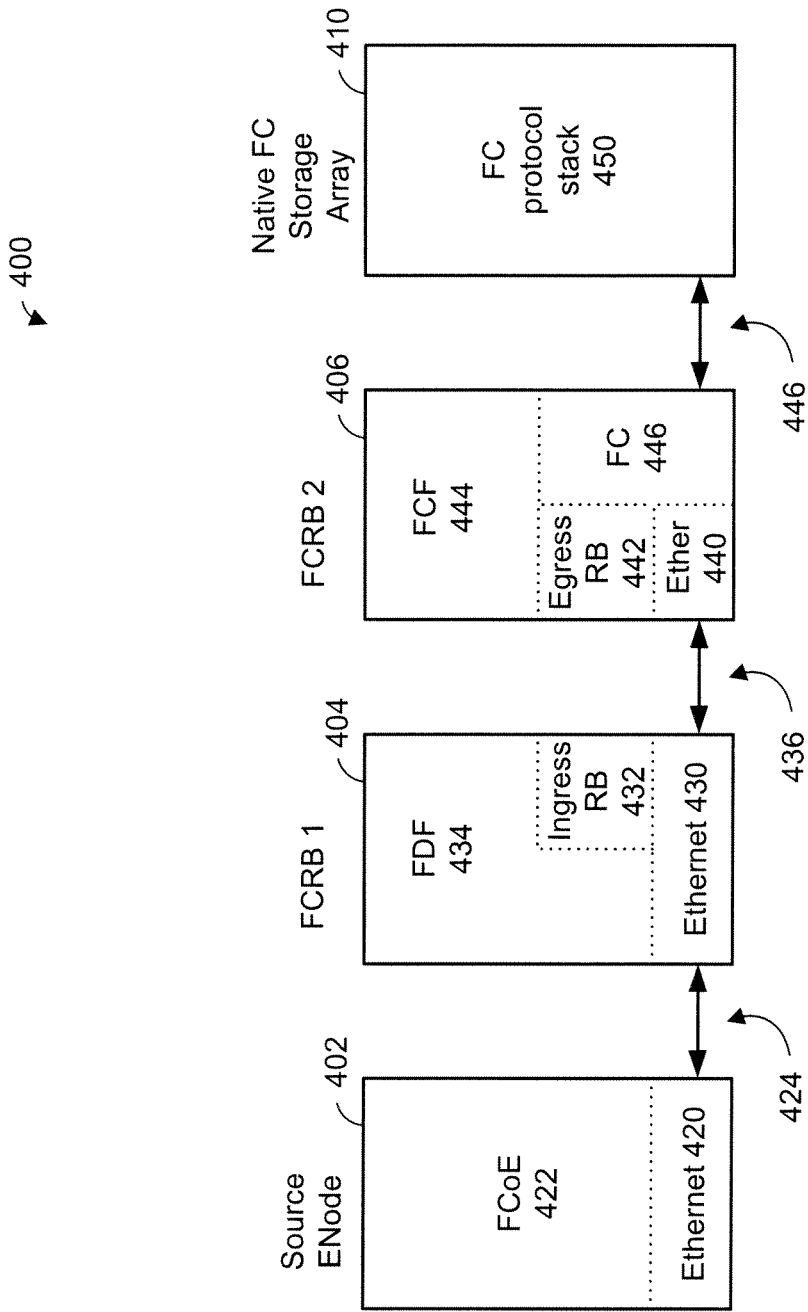
FIG. 6 is a block diagram of another example path of an FCoE packet in a data center network such as the example data center network of FIG. 3, according to an embodiment.
Figure 7:
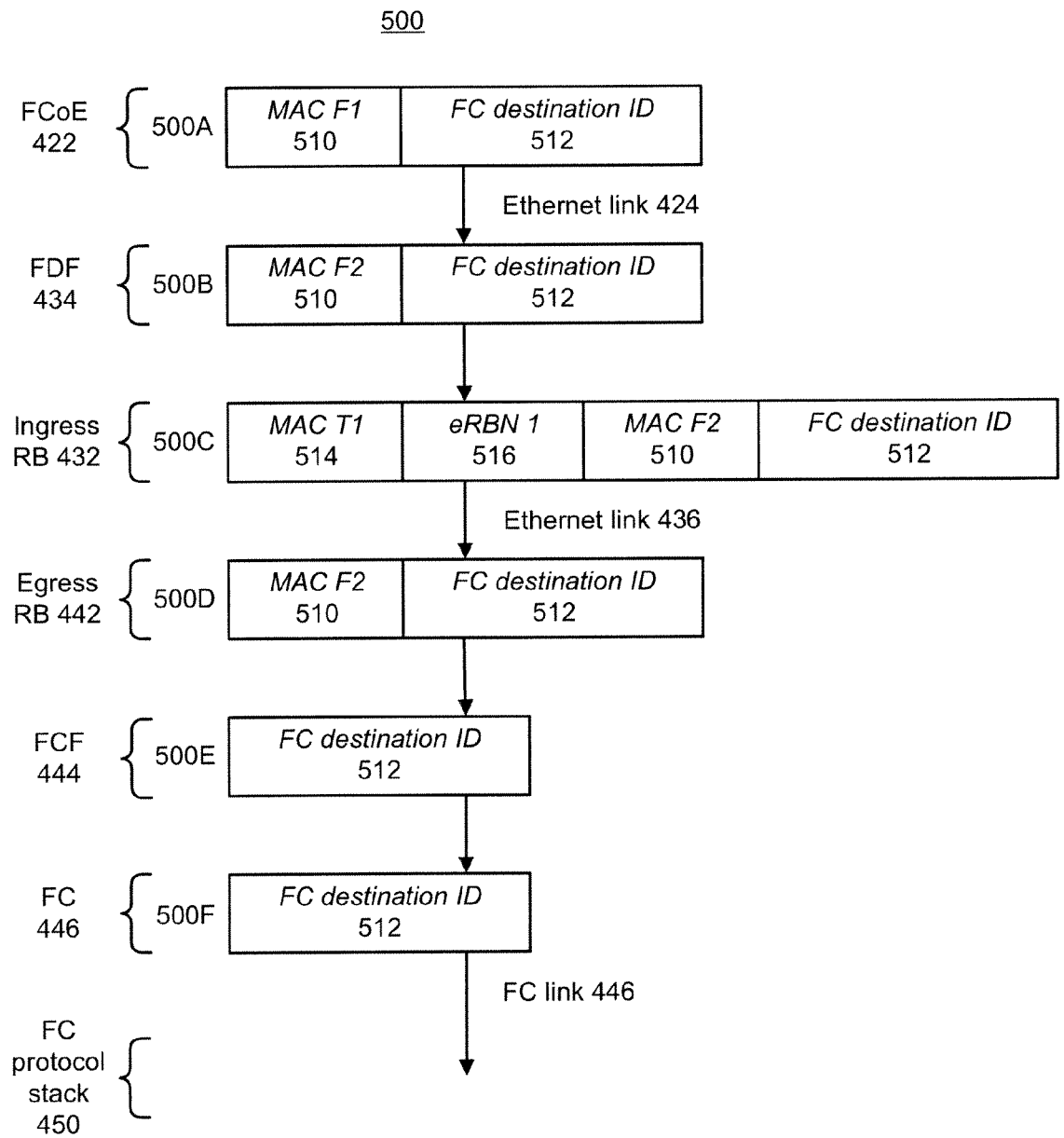
FIG. 7 is a block diagram of an example FCoE packet as it travels through the example path of FIG. 6, according to an embodiment.

The operation of the example data center network 100 in various embodiments, and for specific example traffic scenarios, is seen in more detail in FIGS. 4-9. In general, FIGS. 4-7 correspond to two example scenarios in which a source ENode sends an FCoE packet to one of two different FC destinations in a data center network, and FIGS. 8 and 9 correspond to an example scenario in which a source device (e.g., a device including the source ENode of FIGS. 4-7) sends a non-FCoE packet to a non-FC destination in a data center network. More specifically, FIGS. 4 and 5 correspond to an example of FCoE traffic between two ENodes that are coupled to different TOR FCRBs, but share the same EOR FCRB device, FIGS. 6 and 7 correspond to an example of FCoE traffic from a source ENode to a native FC storage array in a SAN coupled to the EOR FCRB of the source ENode, and FIGS. 8 and 9 correspond to an example of non-FCoE traffic from a source device (e.g., a device including the source ENode of FIGS. 4-7) to a non-FC destination node that is coupled to the EOR FCRB of the source device via an RBridge device. In various embodiments, the example scenarios of FIGS. 4-9 occur in the data center network 100 of FIG. 3. For example, FIGS. 4 and 5 correspond to traffic from ENode 102A to ENode 102C (or vice versa). FIGS. 6 and 7 correspond to traffic from ENode 102A to a storage array in SAN 110, and FIGS. 8 and 9 correspond to traffic from a source device that includes ENode 102A to the non-FC node 116, in various embodiments.

Figure 8:
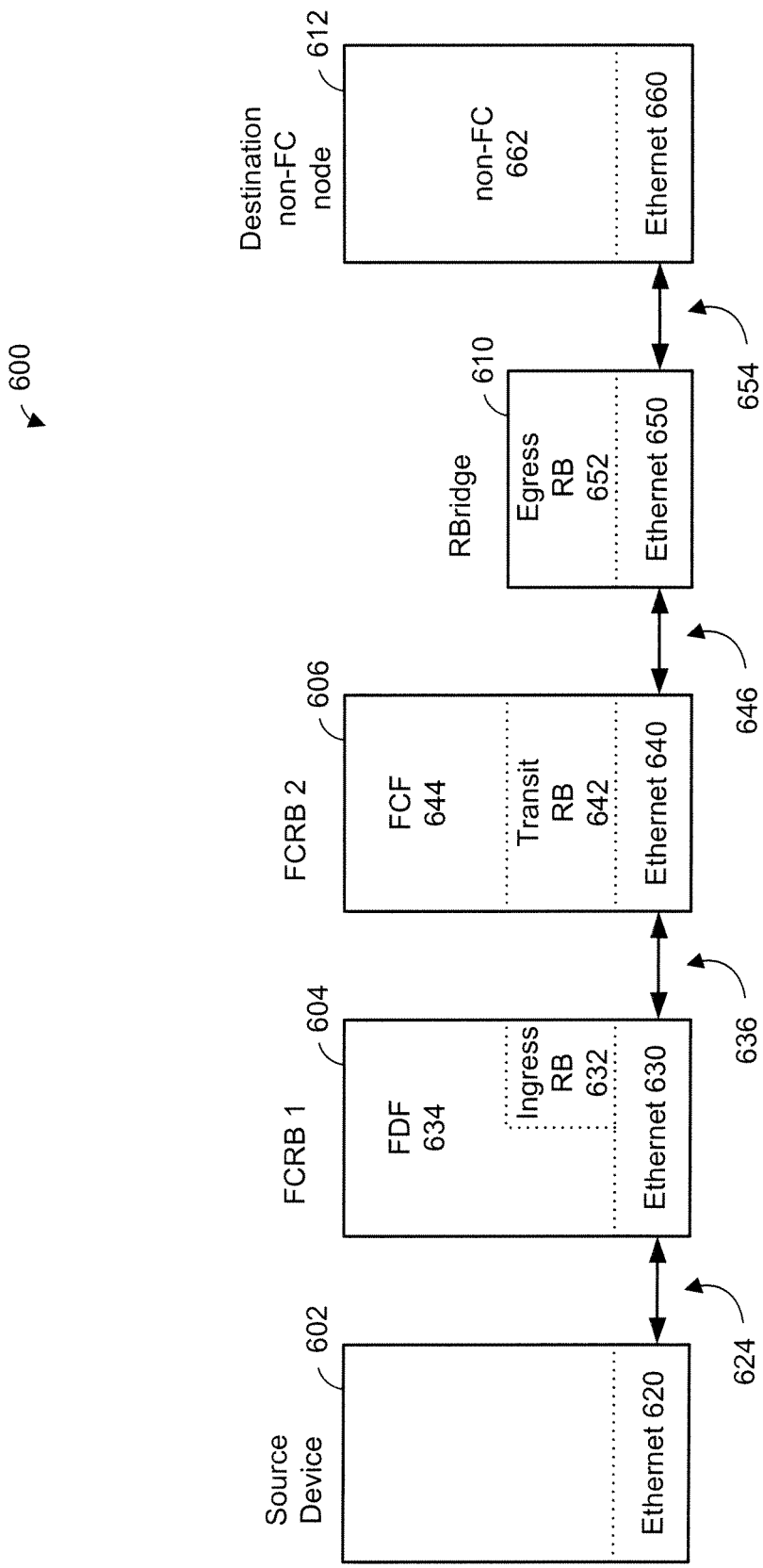
FIG. 8 is a block diagram of an example path of a non-FCoE packet in a data center network such as the example data center network of FIG. 3, according to an embodiment.
Figure 9:
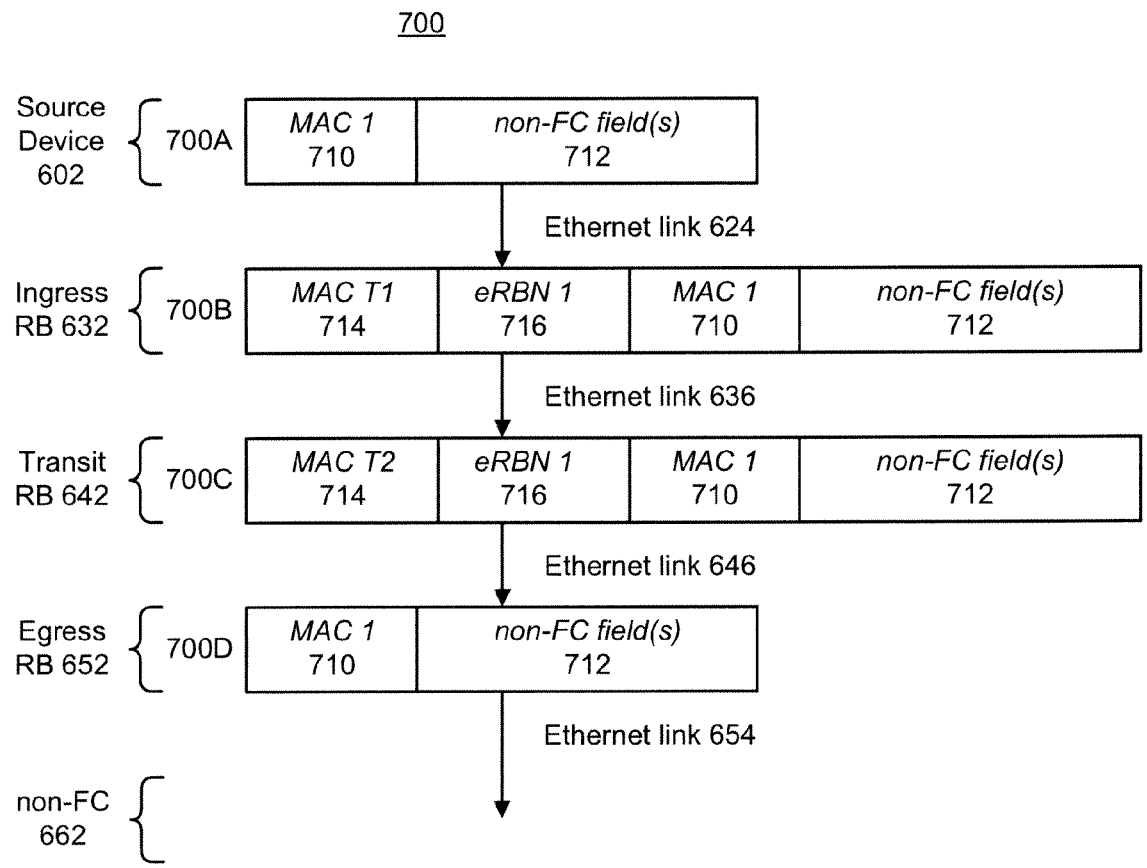
FIG. 9 is a block diagram of an example non-FCoE packet as it travels through the example path of FIG. 8, according to an embodiment.

The three example scenarios and packet paths of FIGS. 4-9 serve to illustrate the operations of example FCRB devices, such as the TOR FCRBs 104A-D and/or EOR FCRBs 106A-106B of FIG. 3, when handling different packet types (i.e., FCoE packets in FIGS. 4-7, and a non-FCoE packet in FIGS. 8 and 9) and for different destination types (i.e., an FCoE destination in FIGS. 4 and 5, a native FC destination in FIGS. 6 and 7, and a non-FCoE, non-native FC destination in FIGS. 8 and 9). As seen in by way of these examples, the use of FCRB devices generally allows packets to follow a short, efficient path from source to destination while still supporting both FCoE and TRILL protocols. Conversely, in conventional architectures that do not include FCRB devices (e.g., with reference to the example network 100 of FIG. 3, where TOR FCRB devices 104A-104D and EOR FCRB devices 106A-106B are replaced with non-FCRB devices), FCoE packets may in some scenarios be required to traverse longer paths (e.g., paths having a larger number of intermediate nodes/hops). For example, FCoE packets may in conventional architectures be required to travel a longer, circuitous route to the destination in order to ensure that each FCoE packet travels to at least one FCoE entity (e.g., FCF or FDF), as required by the current FCoE standard.

Describing now in more detail the example embodiments and scenarios of FIGS. 4-9, FIG. 4 illustrates an example path 200 of an FCoE packet in a data center network, according to an embodiment. In the example path 200, an FCoE packet transmitted by a source ENode 202 travels to a first FCRB device 204 (e.g., a TOR FCRB) via an Ethernet link 224, to a second FCRB device 206 (e.g., an EOR FCRB) via an Ethernet link 236, to a third FCRB device 210 (e.g., another TOR FCRB) via an Ethernet link 246, and to a destination ENode 212 via an Ethernet link 256. In an embodiment, the example path 200 is a path of an FCoE packet in the data center network 100 of FIG. 3, where the source ENode 202, first FCRB device 204, second FCRB device 206, third FCRB device 210, and destination ENode 212 of FIG. 4 correspond to the ENode 102A, TOR FCRB device 104A, EOR FCRB device 106A, TOR FCRB device 104B, and ENode 102C, respectively, of FIG. 3.

The source ENode 202 includes an Ethernet entity 220 and an FCoE entity 222. The first FCRB device 204 includes an Ethernet entity 230, an ingress RBridge entity 232, and an FDF entity 234. In an embodiment where the example path 200 is a path of an FCoE packet in the data center network 100 of FIG. 3, the Ethernet entity 230, ingress RBridge entity 232, and FDF entity 234 of FIG. 4 correspond to the Ethernet interface 120A, TRILL entity 122A, and FCoE entity 124A, respectively, of FIG. 3. The second FCRB device 206 includes an Ethernet entity 240, an egress RBridge entity 242A, an ingress RBridge entity 242B, and an FCF entity 244. In an embodiment where the example path 200 is a path of an FCoE packet in the data center network 100 of FIG. 3, the Ethernet entity 240 and FCF entity 244 of FIG. 4 correspond to the Ethernet interface 130A and FCoE entity 134A, respectively, of FIG. 3, and the RBridge entities 242A-242B of FIG. 4 jointly correspond to the TRILL entity 132A of FIG. 3. The third FCRB device 210 includes an Ethernet entity 250, an egress RBridge entity 252, and an FDF entity 254. In an embodiment where the example path 200 is a path of an FCoE packet in the data center network 100 of FIG. 3, the Ethernet entity 250, egress RBridge entity 252, and FDF entity 254 of FIG. 4 correspond to the Ethernet interface 120B, TRILL entity 122B, and FCoE entity 124B, respectively, of FIG. 3. The destination ENode 212 includes an Ethernet entity 260 and an FCoE entity 262. While FIG. 4 shows particular entities within each of the nodes/devices 202, 204, 206, 210, and 212, additional entities are included in some or all of the nodes/devices in some embodiments. Moreover, in some embodiments, some or all of the entities shown can be logically divided into multiple sub-entities. In some embodiments, the various entities shown in FIG. 4 correspond to different hardware processing engines. In other embodiments, some or all of the entities are implemented in software, or a mixture of software and hardware.

Because FCoE entities are included in FCRB devices 204, 206, and 210, an FCoE packet sent by the source ENode 202 can follow the example path 200 without the additional hops that may be required in conventional architectures. For example, to satisfy the current FCoE standard requirement that FCoE packets be sent through an FCoE entity (i.e., an FCF or FDF), a conventional architecture could require that FCoE packets travel one or more additional hops that are not located on the shortest path to the destination ENode 212. In some scenarios, these extra hops may substantially increase traffic and/or transit times in the data center network. Moreover, because TRILL entities are included in FCRB devices 204, 206, and 210, an FCoE packet can take advantage of the inherent efficiencies provided by the TRILL protocol. For example, in an alternative embodiment where the FCRBs 204, 206, and/or 210 are separated by TRILL clouds, an FCoE packet can be efficiently forwarded between the FRCBs 204, 206, and/or 210 using the shortest-path bridging algorithms of TRILL.

FIG. 5 is a block diagram of an example FCoE packet 300 as it travels through the example path 200 of FIG. 4, according to an embodiment. Reference numbers 300A through 300H represent the FCoE packet 300 at different stages along the path 200 of FIG. 4. While the FCoE packet 300 includes additional headers and/or fields in some embodiments (e.g., a source MAC address, a frame check sequence field, etc.), a simplified FCoE packet 300 is shown in FIG. 5 for clarity and ease of explanation. The modifications to the FCoE packet 300 as it travels along path 200 are described below with reference to both FIGS. 4 and 5.

Initially, the FCoE entity 222 of the source ENode 202 generates the FCoE packet 300A. The generated FCoE packet 300A includes a header 310 that includes an Ethernet destination MAC address, and an encapsulated FC frame 312 that includes an FC destination identifier. The destination MAC address (depicted in FIG. 5 as "MAC F1") corresponds to the FDF entity 234 of the first FCRB device 204. The generated FCoE packet 300A is then sent to the Ethernet entity 220, which in turn (based on the destination MAC address MAC F1) forwards the FCoE packet 300A to the Ethernet entity 230 of the first FCRB device 204 via the Ethernet link 224.

In an embodiment, the Ethernet entity 230 of the first FCRB device 204 corresponds to the Ethernet interface 120A of FIG. 3. The Ethernet entity 230 sends the FCoE packet 300A to the FDF entity 234, which, in an embodiment, corresponds to the FCoE entity 124A of FIG. 3. In other embodiments, the FDF entity 234 is instead an FCF entity. The FDF entity 234 updates the destination MAC address of the header 310 to indicate an FCoE hop target. In an embodiment, the destination MAC address in the header 310 is updated by the FDF entity 234 based on a determination of the FC destination identifier included in the FC frame 312 of the FCoE packet 300A. For example, in some embodiments, the FDF entity 234 utilizes the FC destination identifier as a key to a lookup table that indicates the optimal next hop for reaching the destination corresponding to the FC destination identifier. In one embodiment, for example, the lookup table includes pairs of FC destination identifiers and corresponding next-hop MAC addresses between which it has been determined that the path length is the minimum available path length (e.g., the path includes the fewest number of hops, in an embodiment). For the example path 200, the FDF entity 234 updates the destination MAC address to the MAC address of the FCF entity 244 in the second FCRB device 206 (depicted in FIG. 5 as the address "MAC F2"), resulting in the FCoE packet 300B.

After the destination MAC address has been updated, the FCoE packet 300B is sent to the ingress RBridge entity 232. In an embodiment, the ingress RBridge entity 232 corresponds to an ingress RBridge entity in the TRILL entity 122A of FIG. 3. The ingress RBridge entity 232 encapsulates the FCoE packet 300B by adding one or more headers according to a TRILL protocol, resulting in the encapsulated FCoE packet 300C. In the example embodiment shown in FIG. 5, a first added header 314 includes a destination MAC address that indicates a next TRILL hop target (depicted in FIG. 5 as address "MAC T1"), and a second added header 316 includes an Egress RBridge Nickname that indicates the final RBridge of a TRILL cloud to be traversed by the packet 500 (depicted in FIG. 5 as nickname "eRBN 1"). In an embodiment, the first header 314 is a link transport header arranged according to the TRILL protocol, and the second header 316 is a so-called "TRILL header" also arranged according to the TRILL protocol.

In an embodiment, the ingress RBridge entity 232 determines the Egress RBridge Nickname eRBN 1 based on the destination MAC address MAC F2 in the header 310. For example, in some embodiments, the ingress RBridge entity 232 utilizes the destination MAC address MAC F2 as a key to a lookup table that indicates the optimal egress RBridge for reaching the destination corresponding to the address MAC F2. In one embodiment, for example, the lookup table includes pairs of MAC addresses and corresponding Egress RBridge Nicknames between which it has been determined that the path length is the minimum available path length (e.g., the path includes the fewest number of hops, in an embodiment). For the example path 200, eRBN 1 is the Egress RBridge Nickname corresponding to the egress RBridge entity 242A in the second FCRB device 206.

In an embodiment, the ingress RBridge entity 232 determines destination MAC address MAC T1 based on the determined Egress RBridge Nickname. For example, in some embodiments, the ingress RBridge entity 232 utilizes the Egress RBridge Nickname eRBN 1 as a key to a lookup table that indicates the optimal next-hop RBridge entity for reaching the RBridge entity corresponding to the Egress RBridge Nickname eRBN1. In one embodiment, for example, the lookup table includes pairs of RBridge entity MAC addresses and corresponding Egress RBridge Nicknames between which it has been determined that the path length is the minimum available path length (e.g., the path includes the fewest number of hops, in an embodiment). For the example path 200, the MAC address of the header 314 (i.e., MAC T1) is the MAC address of the egress RBridge entity 242A in the second FCRB device 206.

As seen in FIGS. 4 and 5, the next-hop RBridge entity corresponding to the destination MAC address of header 314 is the same as the egress RBridge entity corresponding to the Egress RBridge Nickname of the header 316. In other words, the packet 300 traverses a TRILL cloud including the ingress RBridge entity 232 and the egress RBridge entity 242A. In other embodiments, where one or more RBridge devices acting as transit RBridges are included between the first FCRB device 204 and the second FCRB device 206, the ingress RBridge entity 232 sets the MAC address of header 314 to the address of the next intervening RBridge device.

The encapsulated FCoE packet 300C is then sent back to the Ethernet entity 230, which in turn (based on the destination MAC address MAC T1) forwards the encapsulated FCoE packet 300C to the Ethernet entity 240 of the second FCRB device 206 via the Ethernet link 236. In an embodiment, the Ethernet entity 240 corresponds to the Ethernet interface 130A of FIG. 3.

The Ethernet entity 240 sends the encapsulated FCoE packet 300C to the egress RBridge entity 242A, which, in an embodiment, corresponds to an egress RBridge entity in the TRILL entity 132A of FIG. 3. The egress RBridge entity 242A decapsulates the encapsulated FCoE packet 300C by removing the first header 314 and the second header 316, resulting in the FCoE packet 300D. The FCoE packet 300D is then sent to the FCF entity 244. In an embodiment, the FCF entity 244 corresponds to the FCoE entity 134A in FIG. 3. The FCF entity 244 updates the destination MAC address in the header 310 to indicate a next FCoE hop target. In an embodiment, the destination MAC address in the header 310 is updated by the FCF entity 244 based on a determination of the FC destination identifier included in the FC frame 312 of the FCoE packet 300D. For example, in some embodiments, the FCF entity 244 utilizes the FC destination identifier in the same manner as the FDF entity 234 of the first FCRB device 204. For the example path 200, the destination MAC address is updated to the MAC address of the FDF entity 254 in the third FCRB device 208 (depicted in FIG. 5 as the address "MAC F3"), resulting in the FCoE packet 300E.

After the destination MAC address has been updated, the FCoE packet 300E is sent to the ingress RBridge entity 242B. In an embodiment, the ingress RBridge entity 242B corresponds to an ingress RBridge entity in the TRILL entity 132A of FIG. 3. The ingress RBridge entity 242B encapsulates the FCoE packet 300E by adding one or more headers according to a TRILL protocol, resulting in the encapsulated FCoE packet 300F. In an embodiment, the same type of headers (i.e., headers 314 and 316) added by the ingress RBridge entity 232 are added by the ingress RBridge entity 242B, but with different destination information in the headers. For the example path 200, the first header 314 in the encapsulated FCoE packet 300F includes the destination MAC address of the egress RBridge entity 252 (depicted in FIG. 5 as address "MAC T2") and the second header 316 includes the Egress RBridge Nickname of the egress RBridge entity 252 (depicted in FIG. 5 as nickname "eRBN 2"). In an embodiment, the Egress RBridge Nickname eRBN 2 is determined based on the destination MAC address MAC F3 in the same manner that the ingress RBridge 232 determined the Egress RBridge Nickname eRBN 1 based on the destination MAC address MAC F2, and the destination MAC address MAC T2 is determined based on the Egress RBridge Nickname eRBN 2 in the same manner that the ingress RBridge 232 determined the destination MAC address T1 based on the Egress RBridge Nickname eRBN1.

As seen in FIGS. 4 and 5, the next-hop RBridge entity corresponding to the destination MAC address of header 314 is the same as the egress RBridge entity corresponding to the Egress RBridge Nickname of the header 316. In other words, the packet 300 again traverses a TRILL cloud including an ingress RBridge entity (ingress RBridge entity 242B) and an egress RBridge entity (egress RBridge entity 252). In other embodiments, where one or more RBridge devices acting as transit RBridges are included between the second FCRB device 206 and the third FCRB device 210, the ingress RBridge entity 242B sets the MAC address of header 314 to the address of the next intervening RBridge device.

The encapsulated FCoE packet 300F is sent back to the Ethernet entity 240, which in turn (based on the destination MAC address MAC T2) forwards the encapsulated FCoE packet 300F to the Ethernet entity 250 of the third FCRB device 210 via the Ethernet link 246. In an embodiment, the Ethernet entity 250 corresponds to the Ethernet interface 120B of FIG. 3.

The Ethernet entity 250 sends the encapsulated FCoE packet 300F to the egress RBridge entity 252, which, in an embodiment, corresponds to an egress RBridge entity in the TRILL entity 122B of FIG. 3. The egress RBridge entity 252 decapsulates the encapsulated FCoE packet 300F by removing the first header 314 and the second header 316, resulting in the FCoE packet 300G. The FCoE packet 300G is then sent to the FDF entity 254. In an embodiment, the FDF entity 254 corresponds to the FCoE entity 124B in FIG. 3. The FDF entity 254 updates the destination MAC address in the header 310 to indicate a next FCoE hop target. In an embodiment, the destination MAC address in the header 310 is updated by the FDF entity 254 based on a determination of the FC destination identifier included in the FC frame 312 of the FCoE packet 300G. For example, in some embodiments, the FDF entity 254 utilizes the FC destination identifier in the same manner as the FDF entity 234 of the first FCRB device 204. For the example path 200, the destination MAC address is updated to the MAC address of the FCoE entity 262 of the destination ENode 212 (depicted in FIG. 5 as the address "MAC F4"), resulting in the FCoE packet 300H.

The FCoE packet 300H is then sent back to the Ethernet entity 250, which in turn (based on the destination MAC address MAC F4) forwards the FCoE packet 300H to the Ethernet entity 260 of the destination ENode 212 via the Ethernet link 256. The Ethernet entity 260 then sends the FCoE packet 300G to the FCoE entity 262, in an embodiment.

In one embodiment, where the FCoE packet 300 of FIG. 5 follows the example path 200 of FIG. 4 in the data center network 100 of FIG. 3, the FCoE packet 300A is forwarded from ENode 102A to FCoE entity 124A of TOR FCRB 104A (via Ethernet interface 120A), the FCoE packet 300B is sent from FCoE entity 124A to TRILL entity 122A of TOR FCRB 104A, the FCoE packet 300C is sent from TRILL entity 122A to an egress RBridge portion of TRILL entity 132A of EOR FCRB 106A (via Ethernet interfaces 120A, 130A), the FCoE packet 300D is sent from the egress RBridge portion of TRILL entity 132A to FCoE entity 134A of EOR FCRB 106A, the FCoE packet 300E is sent from FCoE entity 134A to an ingress RBridge portion of TRILL entity 132A, the FCoE packet 300F is sent from the ingress RBridge portion of TRILL entity 132A to TRILL entity 122B of TOR FCRB 104B (via Ethernet interfaces 130A, 120B), the FCoE packet 300G is sent from TRILL entity 122B to FCoE entity 124B of TOR FCRB 104B, and the FCoE packet 300H is sent from FCoE entity 124B to ENode 102C (via Ethernet interface 120B).

FIG. 6 illustrates an example path 400 of an FCoE packet in a data center network, according to an embodiment. In the example path 400, an FCoE packet transmitted by a source ENode 402 travels to a first FCRB device 404 (e.g., a TOR FCRB) via an Ethernet link 424, to a second FCRB device 406 (e.g., an EOR FCRB) via an Ethernet link 436, and to a destination native FC storage array 410 via an Ethernet link 446. In some embodiments and scenarios, one or more devices in the example path 400 are the same as one or more devices in the example path 200 of FIG. 4. For example, in one embodiment and scenario, the source ENode 402, first FCRB device 404, and second FCRB device 406 are the same as the source ENode 202, first FCRB device 204, and second FCRB device 206, respectively, of FIG. 4, with the example path 200 of FIG. 4 corresponding to a first FCoE packet sent to a first destination and the example path 400 of FIG. 6 corresponding to a second FCoE packet sent to a second destination. In an embodiment, the example path 400 is a path of an FCoE packet in the data center network 100 of FIG. 3, where the source ENode 402, first FCRB device 404, and second FCRB device 406 of FIG. 6 correspond to the ENode 102A, TOR FCRB device 104A, and EOR FCRB device 106A, respectively, of FIG. 3, and the native FC storage array 410 of FIG. 6 corresponds to a native FC storage array within SAN 110 of FIG. 3.

The source ENode 402 includes an Ethernet entity 420 and an FCoE entity 422. The first FCRB device 404 includes an Ethernet entity 430, an ingress RBridge entity 432, and an FDF entity 434. In an embodiment where the example path 400 is a path of an FCoE packet in the data center network 100 of FIG. 3, the Ethernet entity 430, ingress RBridge entity 432, and FDF entity 434 of FIG. 6 correspond to the Ethernet interface 120A, TRILL entity 122A, and FCoE entity 124A, respectively, of FIG. 3. The second FCRB device 406 includes an Ethernet entity 440, an egress RBridge entity 442, an FCF entity 444, and an FC entity 446. In an embodiment where the example path 400 is a path of an FCoE packet in the data center network 100 of FIG. 3, the Ethernet entity 440, egress RBridge entity 442, and FCF entity 444 of FIG. 6 correspond to the Ethernet interface 130A, TRILL entity 132A, and FCoE entity 134A, respectively, of FIG. 3. The native FC storage array 410 includes an FC entity 450 that operates according to an FC protocol stack. While FIG. 6 shows particular entities within each of the nodes/devices 402, 404, 406, and 410, additional entities are included in some or all of the nodes/devices, in some embodiments. Moreover, in some embodiments, some or all of the entities shown can be logically divided into multiple sub-entities. In some embodiments, the various entities shown in FIG. 6 correspond to different hardware processing engines. In other embodiments, some or all of the entities are implemented in software, or a mixture of software and hardware.

Similar to the example embodiment and scenario of FIG. 4, including FCoE entities in FCRB devices 404 and 406 of FIG. 6 allows FCoE packets sent by the source ENode 402 to follow the example path 400 without additional hops that may be required in conventional architectures (e.g., to ensure the FCoE packet passes through an FCF or FDF). Also similar to the embodiment and scenario of FIG. 4, including TRILL entities in FCRB devices 404 and 406 allows the FCoE packets to take advantage of the inherent efficiencies provided by the TRILL protocol (e.g., efficiently forwarding the FCoE packet through a TRILL cloud between FCRB devices 404 and 406, in an alternative embodiment). Unlike the second FCRB device 206 of FIG. 4, however, the second FCRB device 406 of FIG. 6 utilizes different entities/functionalities because the device 406 is coupled to a native FC destination (i.e., native FC storage array 410). Specifically, in the example embodiment and scenario of FIG. 6, the second FCRB device 406 does not utilize an ingress RBridge entity.

FIG. 7 is a block diagram of an example FCoE packet 500 as it travels through the example path 400 of FIG. 6, according to an embodiment. Reference numbers 500A through 500F represent the FCoE packet 500 at different stages along the path 400 of FIG. 6. Again, while the FCoE packet 500 includes additional headers and/or fields in some embodiments (e.g., a source MAC address, a frame check sequence field, etc.), a simplified FCoE packet is shown in FIG. 7 for clarity and ease of explanation. The modifications to the FCoE packet 500 as it travels along path 400 are described below with reference to both FIGS. 6 and 7.

Initially, the FCoE entity 422 of the source ENode 402 generates the FCoE packet 500A. The generated FCoE packet 500A includes a header 510 that includes an Ethernet destination MAC address, and an encapsulated FC frame 512 that includes an FC destination identifier. The FC frame 512 also includes FC data (not seen in FIG. 7), in an embodiment, such as data to be stored in the destination native FC storage array 410, for example, or data relating to other storage transactions involving native FC storage array 410. The destination MAC address (depicted in FIG. 7 as "MAC F1") corresponds to the FDF entity 434 of the first FCRB device 404. The generated FCoE packet 500A is then sent to the Ethernet entity 420, which in turn (based on the destination MAC address MAC F1) forwards the FCoE packet 500A to the Ethernet entity 430 of the first FCRB device 404 via the Ethernet link 424. In an embodiment, the Ethernet entity 430 of the first FCRB device 404 corresponds to the Ethernet interface 120A of FIG. 3.

The Ethernet entity 430 sends the FCoE packet 500A to the FDF entity 434, which, in an embodiment, corresponds to the FCoE entity 124A of FIG. 3. The FDF entity 434 updates the destination MAC address of the header 510 to indicate an FCoE hop target. In an embodiment, the destination MAC address in the header 510 is updated by the FDF entity 434 based on a determination of the FC destination identifier included in the FC frame 512 of the FCoE packet 500A. For example, in various embodiments, the FDF entity 434 updates the destination MAC address in the header 510 in a manner similar to that in which the FDF entity 234 of FIG. 4 updates the destination MAC address in the header 310 of FIG. 5. For the example path 400, the destination MAC address is updated to the MAC address of the FCF entity 444 in the second FCRB device 406 (depicted in FIG. 7 as the address "MAC F2"), resulting in the FCoE packet 500B.

After the destination MAC address has been updated, the FCoE packet 500B is sent to the ingress RBridge entity 432. In an embodiment, the ingress RBridge entity 432 corresponds to an ingress RBridge entity in the TRILL entity 122A of FIG. 3. The ingress RBridge entity 432 encapsulates the FCoE packet 500B by adding one or more headers according to a TRILL protocol, resulting in the encapsulated FCoE packet 500C. In the example embodiment shown in FIG. 7, a first added header 514 includes a destination MAC address that indicates a next TRILL hop target (depicted in FIG. 7 as address "MAC T1"), and a second added header 516 includes an Egress RBridge Nickname that indicates the final RBridge of a TRILL cloud to be traversed by the packet 500 (depicted in FIG. 7 as nickname "eRBN 1"). In an embodiment, the first header 514 is a link transport header arranged according to the TRILL protocol, and the second header 516 is a "TRILL header" also arranged according to the TRILL protocol.

In an embodiment, the Egress RBridge Nickname eRBN 1 is determined by the ingress RBridge entity 432 based on the destination MAC address MAC F2 in the header 510. For example, in various embodiments, the ingress RBridge entity 432 determines the Egress RBridge Nickname of header 516 in a manner similar to that in which the ingress RBridge entity 232 of FIG. 4 determines the Egress RBridge Nickname of header 316 of FIG. 5. For the example path 400, eRBN 1 is the Egress RBridge Nickname corresponding to the egress RBridge entity 442 in the second FCRB device 406.

In an embodiment, the destination MAC address MAC T1 is determined by the ingress RBridge entity 432 based on the determined Egress RBridge Nickname. For example, in various embodiments, the ingress RBridge entity 432 determines the destination MAC address of header 514 in a manner similar to that in which the ingress RBridge entity 232 of FIG. 4 determines the destination MAC address of header 314 of FIG. 5. For the example path 400, the MAC address of the header 514 (i.e., MAC T1) is the MAC address of the egress RBridge entity 442 in the second FCRB device 406. Thus, in the example embodiment and scenario of FIGS. 6 and 7, the next-hop RBridge entity identified by the destination MAC address of header 514 is the same as the egress RBridge entity identified by the Egress RBridge Nickname of the header 516. In other words, the packet 500 traverses a TRILL cloud that, similar to TRILL clouds traversed in FIGS. 4 and 5, consists of only the ingress RBridge entity 432 and the egress RBridge entity 442.

The encapsulated FCoE packet 500C is then sent back to the Ethernet entity 430, which in turn (based on the destination MAC address MAC T1) forwards the encapsulated FCoE packet 500C to the Ethernet entity 440 of the second FCRB device 406 via the Ethernet link 436. In an embodiment, the Ethernet entity 440 is similar to the Ethernet interface 130A of FIG. 3.

The Ethernet entity 440 sends the encapsulated FCoE packet 500C to the egress RBridge entity 442, which, in an embodiment, corresponds to an egress RBridge entity in the TRILL entity 132A of FIG. 3. The egress RBridge entity 442 decapsulates the encapsulated FCoE packet 500C by removing the first header 514 and the second header 516, resulting in the FCoE packet 500D. The FCoE packet 500D is then sent to the FCF entity 444. In an embodiment, the FCF entity 444 corresponds to the FCoE entity 134A in FIG. 3. The FCF entity 444 removes the Ethernet encapsulation of the packet 500 by removing header 510 and sends the packet 500E (now in native FC form) to the FC entity 446. After suitable processing at the FC entity 446 according to an FC protocol, the processed packet 500F is transmitted over the FC link 446 to the FC protocol stack 450 of the destination native FC storage array 410.

In one embodiment, where the FCoE packet 500 of FIG. 7 follows the example path 400 of FIG. 6 in the data center network 100 of FIG. 3, the FCoE packet 500A is forwarded from ENode 102A to the FCoE entity 124A of TOR FCRB 104A (via Ethernet interface 120A), the FCoE packet 500B is sent from the FCoE entity 124A to TRILL entity 122A of TOR FCRB 104A, the FCoE packet 500C is sent from TRILL entity 122A to TRILL entity 132A of EOR FCRB 106A (via Ethernet interfaces 120A, 130A), the FCoE packet 500D is sent from TRILL entity 132A to FCoE entity 134A of EOR FCRB 106A, the FCoE packet 500E is sent from FCoE entity 134A to an FC entity in EOR FCRB 106A, and the FCoE packet 500F is sent from the FC entity to the native FC storage array in SAN 110 (via Ethernet interface 130A).

FIG. 8 illustrates an example path 600 of a non-FCoE packet sent from a source device to a non-FC destination in a data center network, according to an embodiment. In one example embodiment and scenario, the non-FCoE packet traversing path 600 is an IP-over-Ethernet packet. In the example path 600, a non-FCoE packet transmitted by a source device 602 travels to a first FCRB device 604 (e.g., a TOR FCRB) via an Ethernet link 624, to a second FCRB device 606 (e.g. an EOR FCRB) via an Ethernet link 636, to an RBridge device 610 via an Ethernet link 646, and to a destination non-FC node 612 via an Ethernet link 654. In some embodiments and scenarios, one or more devices in the example path 600 are the same as one or more devices in the example path 200 of FIG. 4 and the example path 400 of FIG. 6. For example, in one embodiment and scenario, the source device 602 of FIG. 8 is a device that includes an ENode that is the same as the source ENode 202 of FIG. 4 and the source ENode 402 of FIG. 6, the first FCRB device 604 of FIG. 8 is the same as the first FCRB device 204 of FIG. 4 and the first FCRB device 404 of FIG. 6, and the second FCRB device 606 of FIG. 8 is the same as the second FCRB device 206 of FIG. 4 and the second FCRB device 406 of FIG. 6. In this embodiment, the example path 200 of FIG. 4 corresponds to a first FCoE packet sent to a first destination, the example path 400 of FIG. 6 corresponds to a second FCoE packet sent to a second destination, and the example path 600 of FIG. 8 corresponds to a third, non-FCoE packet sent to a third destination. Moreover, in an embodiment, the example path 600 is a path of a non-FCoE packet in the data center network 100 of FIG. 3, where the source device 602 of FIG. 8 corresponds to a device that includes the ENode 102A of FIG. 3, and where the first FCRB device 604, second FCRB device 606, RBridge device 610, and destination non-FC node 612 of FIG. 8 correspond to the TOR FCRB device 104A, EOR FCRB device 106A, RBridge device 114, and non-FC node 116, respectively, of FIG. 3.

The source device 602 includes an Ethernet entity 620. In some embodiments, the source device 602 also includes an ENode (not seen in FIG. 8) that is not used to generate the non-FCoE packet traversing the path 600, but is able to generate FCoE packets. The first FCRB device 604 includes an Ethernet entity 630, an ingress RBridge entity 632, and an FDF entity 634. In one embodiment where the example path 600 is a path of a non-FCoE packet in the data center network 100 of FIG. 3, the Ethernet entity 630, ingress RBridge entity 632, and FDF entity 634 of FIG. 8 correspond to the Ethernet interface 120A, TRILL entity 122A, and FCoE entity 124A, respectively, of FIG. 3. The second FCRB device 606 includes an Ethernet entity 640, a transit RBridge entity 642, and an FCF entity 644. In one embodiment where the example path 600 is a path of a non-FCoE packet in the data center network 100 of FIG. 3, the Ethernet entity 640, transit RBridge entity 642, and FCF entity 644 of FIG. 8 correspond to the Ethernet interface 130A, TRILL entity 132A, and FCoE entity 134A, respectively, of FIG. 3. In an alternative embodiment, the transit RBridge entity 642 is omitted and the second FCRB device 606 instead includes an egress RBridge entity and an ingress RBridge entity, similar to the second FCRB device 206 of FIG. 4. The RBridge device 610 includes an Ethernet entity 650 and an egress RBridge entity 652. In one embodiment where the example path 600 is a path of a non-FCoE packet in the data center network 100 of FIG. 3, the Ethernet entity 650 and egress RBridge entity 652 of FIG. 8 correspond to the Ethernet interface 136 and TRILL entity 140, respectively, of FIG. 3. The destination non-FC node 612 includes an Ethernet entity 660 and an on-FC entity 662. While FIG. 8 shows particular entities within each of the nodes/devices 602, 604, 606, 610, and 612, additional entities are included in some or all of the nodes/devices in some embodiments. Moreover, in some embodiments, some or all of the entities shown can be logically divided into multiple sub-entities. In some embodiments, the various entities shown in FIG. 8 correspond to different hardware processing engines. In other embodiments, some or all of the entities are implemented in software, or a mixture of software and hardware.

Unlike the embodiments and scenarios of FIGS. 4 and 6, the example path 600 of FIG. 8 does not represent the path of an FCoE packet, and the FCoE entities of the FCRB devices 604, 606 are therefore not utilized, in an embodiment, as described in further detail below with reference to FIG. 9. Similar to the embodiments and scenarios of FIGS. 4 and 6, however, including TRILL entities in FCRB devices 604 and 606 allows the packet to take advantage of the inherent efficiencies provided by the TRILL protocol (e.g., efficiently forwarding the non-FCoE packet through a TRILL cloud between FCRB devices 604 and 606, in an alternative embodiment). Moreover, while FCoE entities 634 and 644 are not utilized for non-FCoE packets in this embodiment, including the FCoE entities 634 and 644 allows the FCRB devices 604 and 606, respectively, to efficiently handle FCoE traffic (e.g., in the manner described with reference to the example embodiments and scenarios of FIGS. 4-7 above) in addition to non-FCoE packets.

Figure 10:
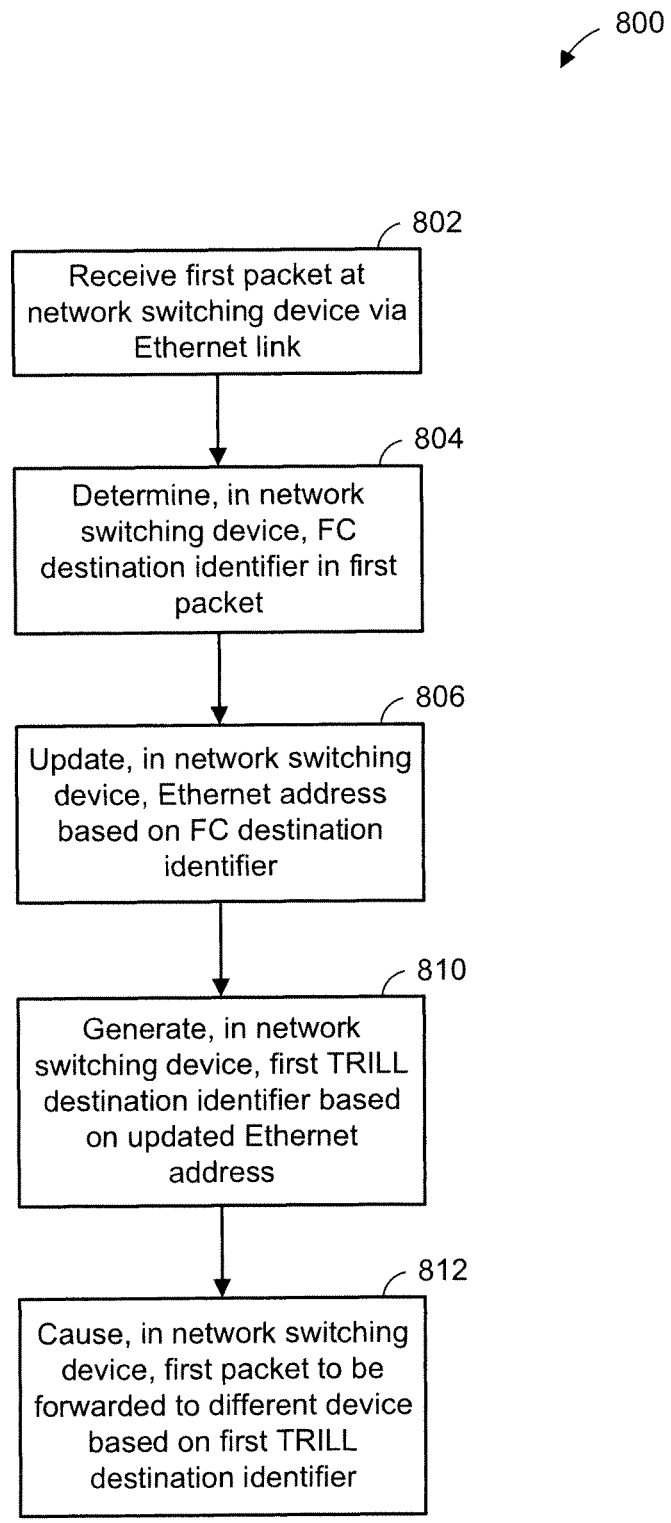
FIG. 10 is a flow diagram of an example method for forwarding FCoE packets in a network switching device, according to an embodiment.

FIG. 9 is a block diagram of an example non-FCoE packet 700 as it travels through the example path 600 of FIG. 8, according to an embodiment. Reference numbers 700A through 700D represent the non-FCoE packet 700 at different stages along the path 600 of FIG. 8. Once again, while the non-FCoE packet 700 includes additional headers and/or fields in some embodiments (e.g., a source MAC address, etc.), a simplified non-FCoE packet is shown in FIG. 10 for clarity and ease of explanation. The modifications to the non-FCoE packet 700 as it travels along path 600 are described below with reference to both FIGS. 8 and 9.

Initially, the source device 602 generates the non-FCoE packet 700A. The generated non-FCoE packet 700A includes a header 710 that includes an Ethernet destination MAC address, and an encapsulated frame 712 that includes one or more non-FC fields. For example, in an embodiment, the non-FC fields include destination information identifying the final destination of the non-FCoE packet 700. For example, in an embodiment where the packet 700 is an IP-over-Ethernet packet, the non-FC field(s) of the encapsulated frame 712 include source and destination IP addresses, an IP version indicator, etc. The Ethernet destination MAC address in the header 710 (depicted in FIG. 9 as "MAC 1") corresponds to the non-FC entity 662 of the non-FC node 612, in an embodiment. The generated non-FCoE packet 700A is then sent to the Ethernet entity 620, which in turn (based on the destination MAC address MAC 1) forwards the non-FCoE packet 700A to the Ethernet entity 630 of the first FCRB device 604 via the Ethernet link 624.

In an embodiment, the Ethernet entity 630 of the first FCRB device 604 corresponds to the Ethernet interface 120A of FIG. 3. Whereas the FCoE packet 300 is processed by the FDF entity 234 of the first FCRB device 204 in FIGS. 4 and 5, and the FCoE packet 500 is processed by the FDF entity 434 of the first FCRB device 404 in FIGS. 6 and 7, the non-FCoE packet 700 instead bypasses the FDF entity 634 in the path 600. In some embodiments, a determination to not bypass or to bypass the FDF entity 634 is based on a determination that the packet 700 is or is not, respectively, an FCoE packet (e.g., by using a packet type determination module such as module 44 of FIG. 1 to determine a VLAN ID, a destination MAC address, and/or any other information included in a header of the packet, in various embodiments). For example, in one embodiment, the FDF entity 634 is bypassed unless a destination MAC address in the packet 700 (e.g., the destination MAC address in the header 710) corresponds to the MAC address of the FDF entity 634. In another embodiment, the FDF entity 634 is bypassed unless a virtual local area network identifier (VLAN ID) in the packet 700 (e.g., in the header 710, or in another header) corresponds to FCoE traffic. In other embodiments, both a destination MAC address and a VLAN ID of the packet 700 are determined in order to make the decision whether to bypass the FDF entity 634. In some embodiments, the determination to bypass or not to bypass the FDF entity 634 is made by the Ethernet entity 630. In other embodiments, the determination is made by another entity (e.g., an access stage of the FDF entity 634, or another entity not shown in FIG. 8).

In the example path 600, the non-FCoE packet 700A is sent to the ingress RBridge entity 632. In an embodiment, the ingress RBridge entity 632 corresponds to an ingress RBridge entity in the TRILL entity 122A of FIG. 3. The ingress RBridge entity 632 encapsulates the non-FCoE packet 700A by adding one or more headers according to a TRILL protocol, resulting in the encapsulated non-FCoE packet 700B. In the example embodiment shown in FIG. 9, a first added header 714 includes a destination MAC address that indicates a next TRILL hop target (depicted in FIG. 9 as address "MAC T1"), and a second added header 716 includes an Egress RBridge Nickname that indicates the final RBridge of a TRILL cloud to be traversed by the packet 700 (depicted in FIG. 9 as nickname "eRBN 1"). In an embodiment, the first header 714 is a link transport header arranged according to the TRILL protocol, and the second header 716 is a "TRILL header" also arranged according to the TRILL protocol.

In an embodiment, the ingress RBridge entity 632 determines the Egress RBridge Nickname eRBN 1 based on the destination MAC address MAC 1 in the header 710. For example, in various embodiments, the ingress RBridge entity 632 determines the Egress RBridge Nickname of header 716 in a manner similar to that in which the ingress RBridge entity 232 of FIG. 4 determines the Egress RBridge Nickname of header 316 of FIG. 5. For the example path 700, eRBN 1 is the Egress RBridge Nickname corresponding to the egress RBridge entity 652 in the RBridge device 610.

In an embodiment, the ingress RBridge entity 632 determines the destination MAC address MAC T1 based on the determined Egress RBridge Nickname. For example, in various embodiments, the ingress RBridge entity 632 determines the destination MAC address of header 714 in a manner similar to that in which the ingress RBridge entity 232 of FIG. 4 determines the destination MAC address of header 314 of FIG. 5. For the example path 700, the MAC address of the header 714 (i.e., MAC T1) is the MAC address of the transit RBridge entity 642 in the second FCRB device 606. Thus, unlike the packets in the example embodiments and scenarios of FIGS. 4-7, the packet 700 traverses a TRILL cloud that includes an ingress RBridge entity 632, a transit RBridge entity 642, and an egress RBridge entity 652. In other embodiments, the path 600 includes additional transit RBridges (e.g., of RBridge devices, or of additional FCRB devices with transit RBridge entities).

The encapsulated non-FCoE packet 700B is then sent back to the Ethernet entity 630, which in turn (based on the destination MAC address MAC T1) forwards the encapsulated non-FCoE packet 700B to the Ethernet entity 640 of the second FCRB device 606 via the Ethernet link 636. In an embodiment, the Ethernet entity 640 corresponds to the Ethernet interface 130A of FIG. 3.

The Ethernet entity 640 sends the encapsulated non-FCoE packet 700B to the transit RBridge entity 642, which, in an embodiment, corresponds to a transit RBridge entity in the TRILL entity 132A of FIG. 3. The transit RBridge entity 642 updates the destination MAC address of the header 714 in the encapsulated non-FCoE packet 700B. In an embodiment, the transit RBridge entity 714 updates the destination MAC address in the header 714 based on a determination of the Egress RBridge Nickname included in the header 716 of the non-FCoE packet 700B. For example, in some embodiments, the transit RBridge entity 714 utilizes the Egress RBridge Nickname as a key to a lookup table that indicates the optimal next hop for reaching the RBridge device or RBridge entity corresponding to the Egress RBridge Nickname. In one embodiment, for example, the lookup table includes pairs of Egress RBridge Nicknames and corresponding next-hop MAC addresses between which it has been determined that the path length is the minimum available path length (e.g., the path includes the fewest number of hops, in an embodiment). For the example path 600, the destination MAC address is updated to the MAC address of the egress RBridge entity 652 in the RBridge device 610 (depicted in FIG. 9 as the address "MAC T2"), resulting in the encapsulated non-FCoE packet 700C.

After the destination MAC address has been updated, the encapsulated non-FCoE packet 700C is sent back to the Ethernet entity 640. Thus, as with the FDF entity 634 of the first FCRB device 604, the FCF entity 644 of the second FCRB device 606 is bypassed. In some embodiments, the bypass of the FCF entity 644 results from the non-FCoE packet 700 (at 700B and/or 700C) not including a header with a destination MAC address that identifies the FCF entity 644. In other embodiments, a determination to bypass the FCF entity 644 is instead or additionally made based on other factors, such as determining that a VLAN ID of the non-FCoE packet 700 does not correspond to FCoE traffic.

Based on the destination MAC address MAC T2, the Ethernet entity 640 forwards the encapsulated non-FCoE packet 700C to the Ethernet entity 650 of the RBridge device 610 via the Ethernet link 646. In an embodiment, the Ethernet entity 650 corresponds to the Ethernet interface 136 of FIG. 3.

The Ethernet entity 650 sends the encapsulated non-FCoE packet 700C to the egress RBridge entity 652 that corresponds to the Egress RBridge Nickname eRBN 1. In an embodiment, the egress RBridge entity 652 corresponds to an egress RBridge entity in the TRILL entity 140 of FIG. 3. The egress RBridge entity 652 decapsulates the encapsulated non-FCoE packet 700C by removing the first header 714 and the second header 716, resulting in the non-FCoE packet 700D. The non-FCoE packet 700D is then sent back to the Ethernet entity 650. Based on the destination MAC address MAC 1, the Ethernet entity 650 forwards the non-FCoE packet 700D to the Ethernet entity 660 in the destination non-FC node 612 via the Ethernet link 654, and the Ethernet entity 660 in turn sends the non-FCoE packet 700D to the non-FC entity 662.

In one embodiment, where the non-FCoE packet 700 of FIG. 9 follows the example path 600 of FIG. 8 in the data center network 100 of FIG. 3, the non-FCoE packet 700A is sent from a source device that includes the ENode 102A to TRILL entity 122A of TOR FCRB 104A (via Ethernet interface 120A), the non-FCoE packet 700B is sent from TRILL entity 122A to TRILL entity 132A of EOR FCRB 106A (via Ethernet interfaces 120A, 130A), the non-FCoE packet 700C is sent from TRILL entity 132A to TRILL entity 140 of RBridge device 114 (via Ethernet interfaces 130A, 136), and the non-FCoE packet 700D is sent from TRILL entity 140 to non-FC node 116 (via via Ethernet interface 136).

FIG. 10 is a flow diagram of an example method 800 for forwarding FCoE packets in a network switching device, according to an embodiment. In an embodiment, the method 800 is implemented by an FCRB device such as one of the TOR FCRB devices 104A-104D or EOR FCRB devices 106A-106B in the example data center network 100 of FIG. 3.

At block 802, a first packet is received at the network switching device performing the method 800 via an Ethernet link. In an embodiment, the packet is received by an Ethernet interface similar to one of the Ethernet interfaces 120 or 130 of FIG. 3. In one example embodiment and scenarios, the first packet is received from an ENode similar to one of ENodes 102A-102H of FIG. 3.

At block 804, an FC destination identifier included in the first packet received at block 802 is determined by the network switching device performing the method 800. In an embodiment, the FC destination identifier is determined by an entity similar one of the FCoE entities 124 or 134 of FIG. 3.

At block 806, an Ethernet address (e.g., a destination MAC address in a header of the first packet, in an embodiment) is updated by the network switching device performing the method 800, based on the FC destination identifier determined at block 804. In an embodiment, the Ethernet address is updated by an entity similar to one of the FCoE entities 124 or 134 of FIG. 3 (e.g., a same FCoE entity performing the block 804). In some embodiments, the Ethernet address is a destination MAC address in the first packet. For example, the Ethernet address is a destination MAC address that is updated to be the same as a MAC address of an FCF entity, FDF entity, or ENode in various embodiments and scenarios, depending on which entity or node provides a shortest path to the destination corresponding to the FC destination identifier.

At block 810, a first TRILL destination identifier is generated by the network switching device performing the method 800, based on the Ethernet address as updated at block 806. In an embodiment, the first TRILL destination identifier is generated by an entity similar to one of the TRILL entities 122 or 132 of FIG. 3. In one embodiment, the first TRILL destination identifier is an Egress RBridge Nickname corresponding to an RBridge that provides a shortest path to the destination corresponding to the destination MAC address as updated at block 806.

At block 812, the first packet is caused to be forwarded, by the network switching device performing the method 800, to a different device based on the first TRILL destination identifier generated at block 810. In an embodiment, the first packet is caused to be forwarded at least in part by one of the TRILL entities 122 or 132 of FIG. 3 (e.g., a same TRILL entity that generates the first TRILL destination identifier at block 810). In one embodiment, causing the first packet to be forwarded to a different device includes encapsulating the first packet with one or more headers that include additional destination information. For example, in one embodiment where the Ethernet address updated at block 806 is a first MAC address, block 812 includes generating a second MAC address based on the first TRILL destination identifier, and adding one or more headers to the first packet that include the second MAC address and the first TRILL destination identifier. The second MAC address is a MAC address of an RBridge entity or RBridge device that provides a shortest path to an RBridge device or entity corresponding to the first TRILL destination identifier, in various embodiments and scenarios.

In some embodiments, the method 800 includes additional blocks not shown in FIG. 10. For example, in one embodiment, the method 800 also includes determining that the first packet received at block 802 is an FCoE packet. In an embodiment, this determination occurs prior to determining the FC destination identifier at block 804. In some embodiments, determining that the first packet is an FCoE packet includes determining a VLAN ID included in the first packet, and/or determining a MAC address included in the first packet. For example, in one embodiment, it is determined that the packet is an FCoE packet if a VLAN ID indicates that the packet is associated with a VLAN reserved for FCoE traffic, and/or if a destination MAC address in the first packet is the MAC address of an FCoE entity performing blocks 804 and 806 of the method 800.

As another example, in an embodiment, the method 800 includes, prior to determining the FC destination identifier at block 804, removing one or more existing headers from the received first packet. For example, in one embodiment and scenario where the first packet was TRILL-encapsulated prior to being received at block 802, the method 800 includes removing a link transport header and "TRILL header" from the first packet.

As yet another example, in some embodiments, the method 800 includes receiving and processing a second packet that is not an FCoE packet, and therefore is to be forwarded based on the TRILL protocol but not based on the FCoE protocol. For example, in an embodiment, the method 800 includes receiving a second packet at the network switching device performing the method 800 via an Ethernet link, determining that the second packet is not an FCoE packet, generating a second TRILL destination identifier (e.g., a second Egress RBridge Nickname) based on a MAC address included in the second packet (e.g., a next FCoE hop target address), and causing the second packet to be forwarded to a different device based on the generated second TRILL destination identifier. In some of these embodiments, the second TRILL destination identifier is generated in a manner similar to that in which the first TRILL destination identifier is generated. Moreover, in some embodiments, the second packet is caused to be forwarded to a different device in part by determining an additional MAC address (e.g. an address of a transit RBridge) based on the second TRILL destination identifier, and adding one or more headers to the second packet that include the additional MAC address and the second TRILL destination identifier.

Figure 11:
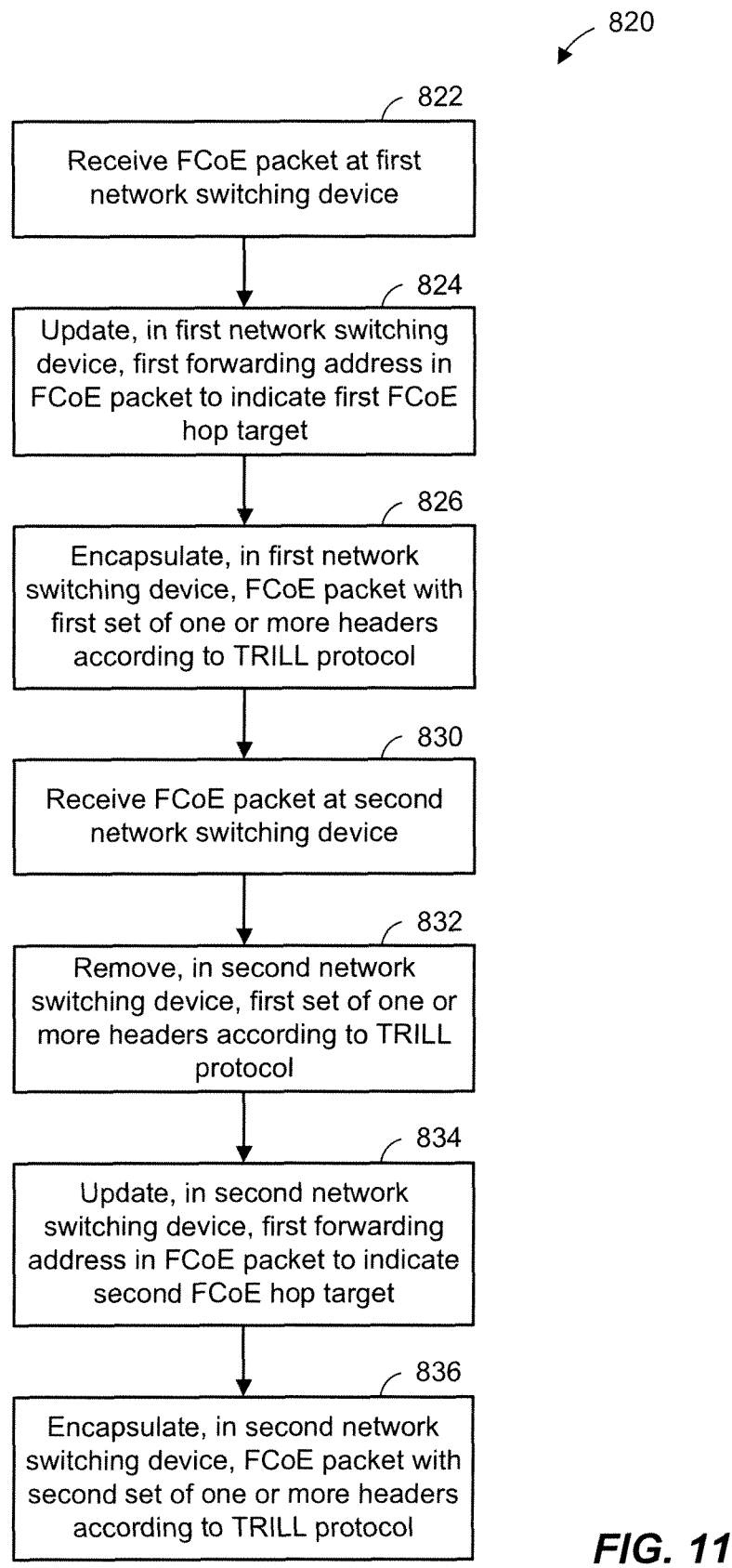
FIG. 11 is a flow diagram of an example method for forwarding FCoE packets in a data center network, according to an embodiment.

FIG. 11 is a flow diagram of an example method 820 for forwarding FCoE packets in a data center network, according to an embodiment. In an embodiment, the method 820 is implemented by one or more FCRB devices in a data center network, such as one or more of the TOR FCRB devices 104A-104D and/or EOR FCRB devices 106A-106B in the example data center network 100 of FIG. 3.

At block 822, an FCoE packet is received at a first network switching device. In an embodiment, the first network switching device is similar to one of the TOR FCRB devices 104A-104D in the data center network 100 of FIG. 3. In an embodiment, the FCoE packet is received by an Ethernet interface similar to an Ethernet interface 120 of one of the TOR FCRB devices 104A-104D. In one embodiment and scenario, the FCoE packet is received from an ENode similar to one of ENodes 102A-102H in FIG. 3.

At block 824, a first forwarding address in the FCoE packet is updated, in the first network switching device, to indicate a first FCoE hop target. In an embodiment, the first forwarding address is updated based on an FC destination identifier (e.g., D_ID) included in the FCoE packet. For example, in an embodiment, an FC destination identifier is used to determine a shortest hop path to the destination corresponding to the FC destination identifier. The first FCoE hop target is a next-hop FCoE entity, in an embodiment. For example, in one embodiment, the first FCoE hop target is an FCoE entity, within a second network switching device, that performs the subsequent block 834 (discussed below). In an embodiment, updating the first forwarding address is performed by an FCoE entity (e.g., an FDF entity) such as an FCoE entity 124 of one of the TOR FCRB devices 104A-104D in FIG. 3.

At block 826, the FCoE packet is encapsulated, in the first network switching device, with a first set of one or more headers according to a TRILL protocol. In an embodiment, a TRILL destination identifier (e.g., an Egress RBridge Nickname), and a second forwarding address indicating a first TRILL hop target, are included in the one or more headers. The TRILL destination identifier is generated based on the first forwarding address (as updated at block 824) and the second forwarding address is generated based on the generated TRILL destination identifier, in an embodiment. The first TRILL hop target is a next-hop TRILL device or entity (e.g., a transit or egress RBridge device or entity), in an embodiment. In an embodiment, encapsulating the FCoE packet is performed by a TRILL entity (e.g., an RBridge entity) such as a TRILL entity 122 of one of the TOR FCRB devices 104A-104D in FIG. 3.

At block 830, the FCoE packet processed at the first network switching device is received at a second network switching device. In an embodiment, the second network switching device is similar to one of the EOR FCRB devices 106A-106B in the data center network 100 of FIG. 3. In an embodiment, the FCoE packet is received by an Ethernet interface similar to an Ethernet interface 130 of one of the EOR FCRB devices 106A-106B.

At block 832, the first set of one or more headers that was used to encapsulate the FCoE packet at block 826 is removed in the second network switching device. In an embodiment, removing the first set of one or more headers is performed by a TRILL entity (e.g., an RBridge entity) such as a TRILL entity 132 of one of the EOR FCRB devices 106A-106B in FIG. 3.

At block 834, the first forwarding address in the FCoE packet, previously updated at block 824, is updated again in the second network switching device to indicate a second FCoE hop target. In an embodiment, the first forwarding address is updated based on a same FC destination identifier (e.g., D_ID) that was used at block 824 to update the first forwarding address. For example, in an embodiment, an FC destination identifier is again used to determine a shortest hop path to the destination corresponding to the FC destination identifier. The second FCoE hop target is a next-hop FCoE entity, in an embodiment. For example, in one embodiment, the second FCoE hop target is an FCoE entity within a third network switching device that subsequently receives the FCoE packet. In an embodiment, updating the first forwarding address is performed by an FCoE entity (e.g., an FCF entity) such as an FCoE entity 134 of one of the EOR FCRB devices 106A-106B in FIG. 3.

At block 836, the FCoE packet is again encapsulated according to the TRILL protocol, but now in the second network switching device and using a second set of one or more headers. The TRILL encapsulation at block 836 is similar to the TRILL encapsulation at block 826, in an embodiment. In an embodiment, the FCoE packet is encapsulated by a TRILL entity (e.g., an RBridge entity) such as a TRILL entity 132 of one of the EOR FCRB devices 106A-106B in FIG. 3.

In some embodiments, blocks 830, 832, 834, and 836 of the method 820 are omitted. Moreover, in some embodiments, the method 820 includes additional blocks not shown in FIG. 11. For example, in one embodiment, the method 820 also includes, after block 826 and before block 830, forwarding the FCoE packet to one or more RBridge devices coupled between the first and the second network switching device.

As another example, in an embodiment, the method 820 also includes, after block 836, receiving the FCoE packet at a third network switching device (e.g., at one of TOR FCRB devices 104A-104D of FIG. 3 that is different than another one of TOR FCRB devices 104A-104D corresponding to the first network switching device), removing (in the third network switching device) the second set of one or more headers added at block 836, and updating (e.g., in an FDF of the third switching device) the first forwarding address of the FCoE packet to indicate a third FCoE hop target (e.g., based on a same FC destination identifier previously used to update the first forwarding address at blocks 824 and 834). The third FCoE hop target is a next-hop FCoE entity, in an embodiment. For example, in one embodiment, the third FCoE hop target is an ENode.

In some embodiments, at least portions of the packet processing techniques described above are implemented in hardware or firmware. For example, the Ethernet interfaces 120 and 130, TRILL entities 122 and 132, and/or FCoE entities 124 and 134 of FIG. 3 are, in whole or in part, implemented by hardware or firmware, in an embodiment. In some of these embodiments, the blocks, operations, techniques, etc., are implemented in, for example, a custom integrated circuit (IC), an application specific integrated circuit (ASIC), a programmable logic device (PLD), a field programmable logic array (FPGA), a programmable logic array (PLA), etc.

Embodiments of the present disclosure may be embodied in any type of network device used in a wired or wireless communication system including, for example, devices used in communication systems including or coupled to a wired or wireless LAN or a wired or wireless WAN, Internet, cable and satellite based communication systems (such as Internet, data, video and voice communication systems), wireless telephone systems (including cellular phone systems, voice over internet protocol (VoIP) systems, home-based wireless telephone systems), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A first network switching device comprising:
    a first Ethernet interface configured to receive a Fibre Channel over Ethernet (FCoE) packet that includes a first forwarding address in a first header of the FCoE packet, wherein the first header was not added to the FCoE packet according to a Transparent Interconnection of Lots of Links (TRILL) protocol;
    a first FCoE entity, implemented using one or more integrated circuits, configured to update the first forwarding address included in the first header of the FCoE packet to indicate a first FCoE hop target that is an intermediate destination different than an endpoint destination of the FCoE packet; and
    a first TRILL entity, implemented using one or more integrated circuits and configured to encapsulate the FCoE packet, having the first header, with a set of one or more second headers according to the TRILL protocol.

2. A first network switching device according to claim 1,
    wherein the first FCoE entity is configured to update the first forwarding address in the first header of based on a Fibre Channel (FC) destination identifier included in the FCoE packet, and
    wherein the first TRILL entity is configured to encapsulate the FCoE packet with the set of one or more second headers at least in part by generating a TRILL destination identifier in the set of one or more second headers based on the first forwarding address, and generating a second forwarding address in the set of one or more second headers based on the TRILL destination identifier to indicate a first TRILL hop target.

3. A data center network including the first network switching device of claim 2, further comprising:

a second network switching device, wherein the second network switching device is communicatively coupled to the first network switching device and comprises a second Ethernet interface configured to receive the FCoE packet from the first network switching device, a second TRILL entity configured to remove the set of one or more second headers from the FCoE packet, and a second FCoE entity configured to update the first forwarding address included in the first header of the FCoE packet based on the FC destination identifier to indicate a second FCoE hop target.

4. A data center network according to claim 3, wherein the second TRILL entity is further configured to encapsulate the FCoE packet with a set of one or more third headers according to the TRILL protocol.

5. A data center network according to claim 4, further comprising:

a third network switching device, wherein the third network switching device is communicatively coupled to the second network switching device and comprises a third Ethernet interface configured to receive the FCoE packet from the second network switching device, a third TRILL entity configured to remove the set of one or more third headers from the FCoE packet, and a third FCoE entity configured to update the first forwarding address included in the first header of the FCoE packet based on the FC destination identifier to indicate a third FCoE hop target.

6. A data center network according to claim 5, wherein
the first network switching device is a first top-of-rack network switching device communicatively coupled to a first set of one or more FCoE nodes,
the second network switching device is an end-of-rack network switching device,
the third network switching device is a second top-of-rack network switching device communicatively coupled to a second set of one or more FCoE nodes,
the first FCoE hop target corresponds to the second FCoE entity,
the second FCoE hop target corresponds to the third FCoE entity,
the third FCoE hop target corresponds to at least one of the second set of one or more FCoE nodes, and
the first TRILL hop target corresponds to the second TRILL entity.

7. A data center network according to claim 6, wherein
the first FCoE entity includes a first FC data-plane forwarder (FDF) entity,
the second FCoE entity includes an FC forwarder (FCF) entity,
the third FCoE entity includes a second FDF entity,
the first TRILL entity includes a first set of one or more routing bridge (RBridge) entities, and
the second TRILL entity includes a second set of one or more RBridge entities.

8. A method for forwarding Fibre Channel over Ethernet (FCoE) packets, the method comprising:

receiving, at a first network switching device, an FCoE packet that includes a first forwarding address in a first header of the FCoE packet, wherein the first header was not added to the FCoE packet according to a Transparent Interconnection of Lots of Links (TRILL) protocol;

updating, in the first network switching device, the first forwarding address included in the first header of the FCoE packet to indicate a first FCoE hop target that is an intermediate destination different than an endpoint destination of the FCoE packet; and encapsulating, in the first network switching device, the FCoE packet, having the first header, with a set of one or more second headers according to the TRILL protocol.

9. A method according to claim 8,
wherein updating the first forwarding address includes updating the first forwarding address in the first header of the FCoE packet based on a Fibre Channel (FC) destination identifier included in the FCoE packet, and
wherein encapsulating the FCoE packet with the set of one or more second headers includes
generating a TRILL destination identifier in the first set of one or more second headers based on the first forwarding address in the first header, and
generating a second forwarding address in the set of one or more second headers based on the TRILL destination identifier.

10. A method according to claim 9, further comprising:
receiving, at a second network switching device, the FCoE packet;
removing, in the second network switching device, the set of one or more second headers according to the TRILL protocol;
updating, in the second network switching device, the first forwarding address included in the first header of the FCoE packet based on the FC destination identifier to indicate a second FCoE hop target; and
encapsulating, in the second network switching device, the FCoE packet with a set of one or more third headers according to the TRILL protocol.

11. A method according to claim 10, further comprising:
receiving, at a third network switching device, the FCoE packet;
removing, in the third network switching device, the set of one or more third headers from the FCoE packet; and
updating, in the third network switching device, the first forwarding address included in the first header of the FCoE packet based on the FC destination identifier to indicate a third FCoE hop target.

* * * * *